(12) United States Patent
Kasahara et al.

(10) Patent No.: US 6,784,594 B2
(45) Date of Patent: *Aug. 31, 2004

(54) ELECTROSTATIC ACTUATOR AND METHOD OF DRIVING THE SAME

(75) Inventors: Akihiro Kasahara, Sambu-gun (JP); Masayuki Sekimura, Chofu (JP); Akihiro Koga, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/619,569

(22) Filed: Jul. 16, 2003

(65) Prior Publication Data

US 2004/0012300 A1 Jan. 22, 2004

Related U.S. Application Data

(62) Division of application No. 09/818,840, filed on Mar. 28, 2001, now Pat. No. 6,670,738.

(30) Foreign Application Priority Data

Mar. 30, 2000 (JP) ........................................ 2000-094569

(51) Int. Cl.⁷ ............................ H02N 1/00; G02B 7/04; G33B 19/02
(52) U.S. Cl. ........................ 310/309; 318/116; 396/133; 348/374
(58) Field of Search ......................... 310/309; 318/116; 348/374; 396/75, 661, 133, 439

(56) References Cited

U.S. PATENT DOCUMENTS

| | | | |
|---|---|---|---|
| 5,235,225 A | 8/1993 | Colgate | 310/12 |
| 5,523,639 A | 6/1996 | Okamoto et al. | 310/309 |
| 6,531,804 B2 | 3/2003 | Kasahara | 310/309 |
| 6,611,079 B2 | 8/2003 | Koga et al. | 310/309 |
| 2001/0028203 A1 | 10/2001 | Kasahara et al. | 310/309 |
| 2002/0036443 A1 | 3/2002 | Akiba et al. | 310/309 |
| 2002/0037171 A1 | 3/2002 | Kasahara | 396/661 |
| 2002/0050764 A1 | 5/2002 | Koga et al. | 310/309 |
| 2002/0074896 A1 | 6/2002 | Kasahara | 310/309 |
| 2002/0106204 A1 | 8/2002 | Miyamura | 398/89 |

FOREIGN PATENT DOCUMENTS

| | | | |
|---|---|---|---|
| EP | 0 911 952 A2 | 4/1999 | |
| JP | 08-51786 | 2/1996 | ............ H02N/1/00 |
| JP | 08-140367 | 5/1996 | |
| JP | 8-140367 | 5/1996 | |
| JP | 9-163761 | 6/1997 | |
| JP | 10-239578 | 9/1998 | ............ G02B/7/04 |
| JP | 10-239740 | 9/1998 | ............ G02B/7/04 |
| JP | 11-4803 | 1/1999 | ............ G02B/7/04 |
| JP | 11-281870 | 10/1999 | ............ G02B/7/04 |

OTHER PUBLICATIONS

"Electrostatic Linear Micro Actuators with Vibrating Motion for Pan–Tilt Drive of a Micro CCD Camera", Koga et al., Jan. 1996.

(List continued on next page.)

*Primary Examiner*—Karl Tamai
(74) *Attorney, Agent, or Firm*—Oblon, Spivak, McClelland, Maier & Neustadt, P.C.

(57) ABSTRACT

A first stator is provided with stator electrodes sequentially arranged in a predetermined direction. An extended electrode is mounted on a second stator arranged to face the first stator. A slider is movably arranged between the first and second stators. The slider is provided with a large number of slider electrodes arranged to face the stator electrodes and a second slider electrode facing the extended electrode. The slider electrodes are maintained at the ground potential. A first and second driving voltage are periodically applied to the stator electrodes and to the extended electrode, respectively, which are opposite to each other in phase and are periodically switched between the ground potential and the positive driving voltage. Thus, the slider is moved in a direction while being vibrated.

14 Claims, 20 Drawing Sheets

OTHER PUBLICATIONS

"Attachment/Detachment Electrostatic Micro Actuators for Pan–Tilt Drive of a Micro CCD Camera", Koga et al., Jan. 1996.

Akihiro Koga, et al.; "Electrostatic Linear Microactuator Mechanism for Focusing a CCD Camera"; Journal of Lightwave Technology, vol. 17, No. 1, Jan. 1999, pp. 43–47.

U.S. patent application Ser. No. 09/963,424, Akiba et al., filed Sep. 27, 2001.

U.S. patent application Ser. No. 09/964,699, Kasahara, filed Sep. 28, 2001.

U.S. patent application Ser. No. 10/446,964, Koga et al., filed May 29, 2003.

U.S. patent application Ser. No. 10/447,111, Koga et al., filed May 29, 2003.

U.S. patent application Ser. No. 10/445,064, Akiba et al., filed May 27, 2003.

U.S. patent application Ser. No. 09/818,840, Kasahara et al., filed Mar. 28, 2001.

U.S. patent application Ser. No. 10/299,662, Koga et al., filed Nov. 20, 2002.

U.S. patent application Ser. No. 10/445,126, Akiba et al., filed May 27, 2003.

U.S. patent application Ser. No. 10/243,677, Koga et al., filed Sep. 16, 2002.

U.S. patent application Ser. No. 10/327,907, Akiba, filed Dec. 26, 2002.

U.S. patent application Ser. No. 10/619,569, Kasahara et al., filed Jul.16, 2003.

U.S. patent application Ser. No. 10/619,500, Kasahara et al., filed Jul.16, 2003.-

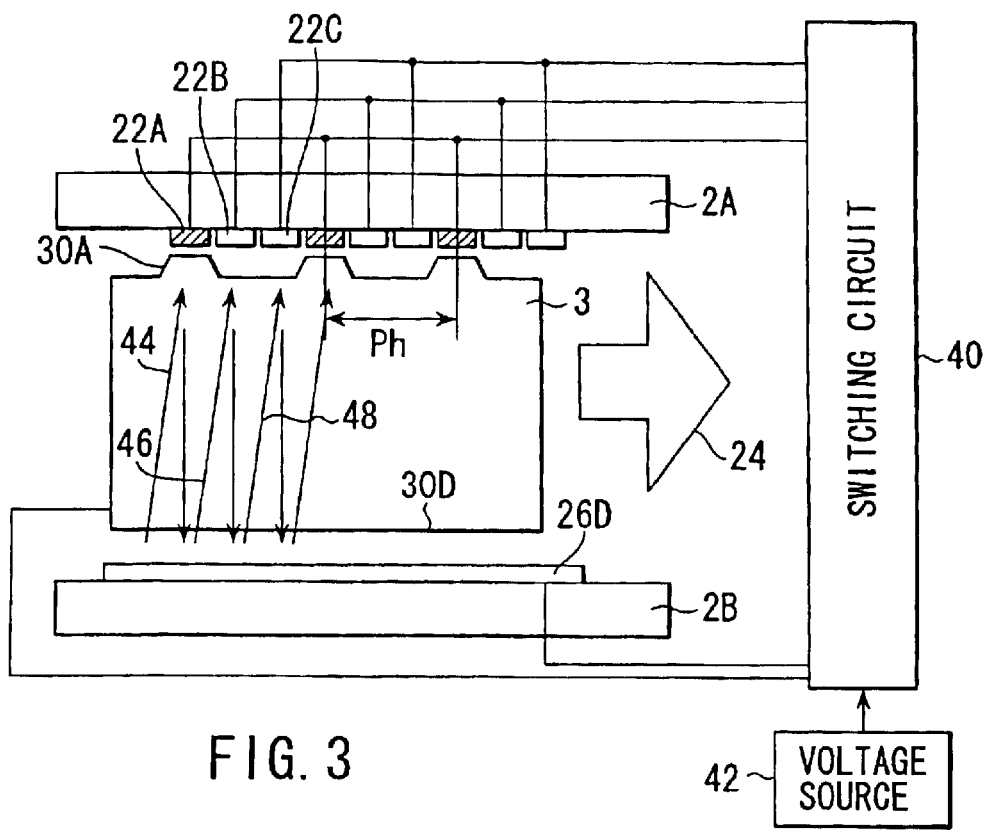
FIG. 3
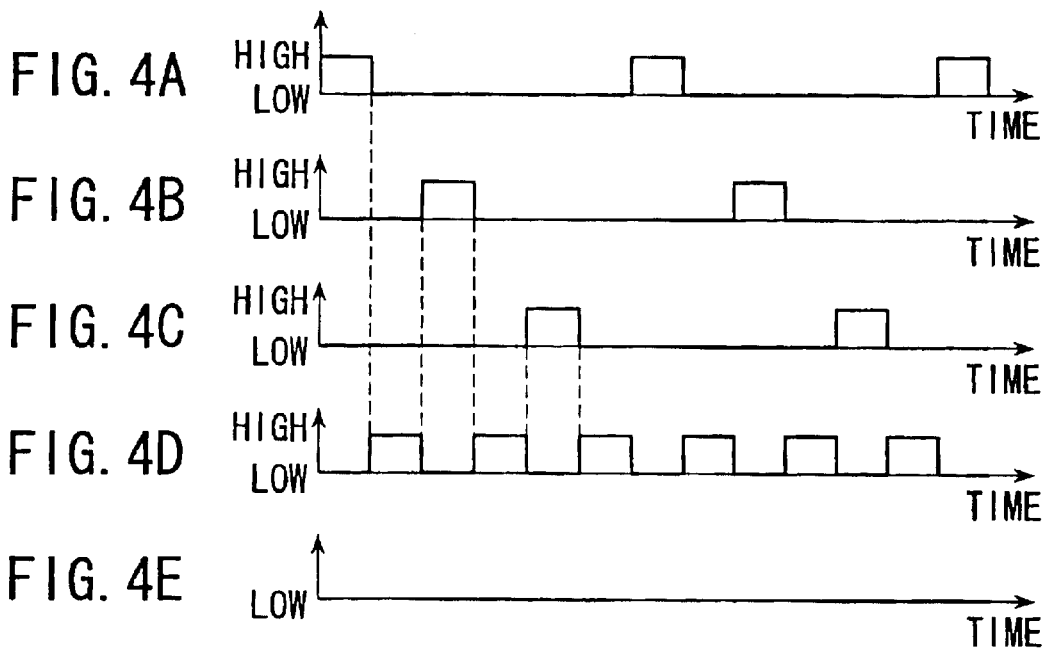
FIG. 4A
FIG. 4B
FIG. 4C
FIG. 4D
FIG. 4E

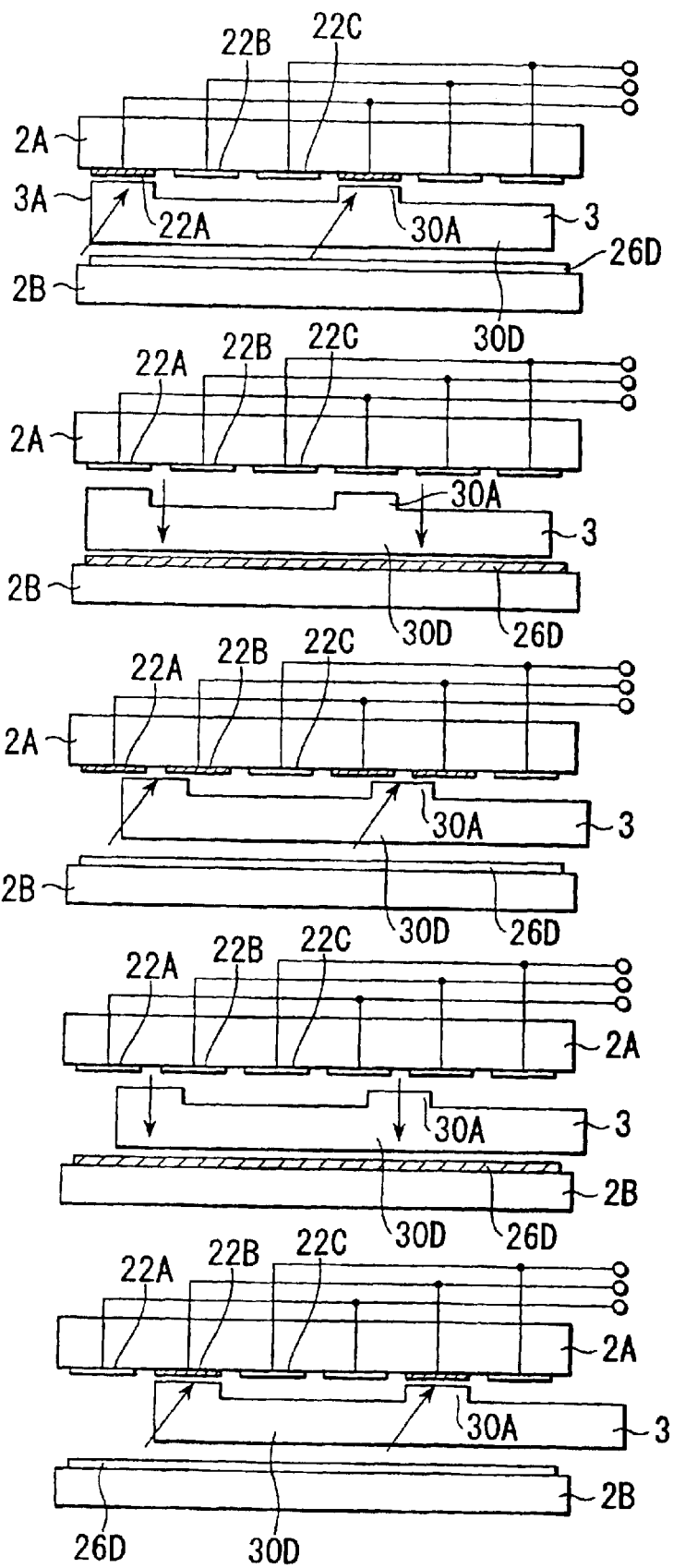

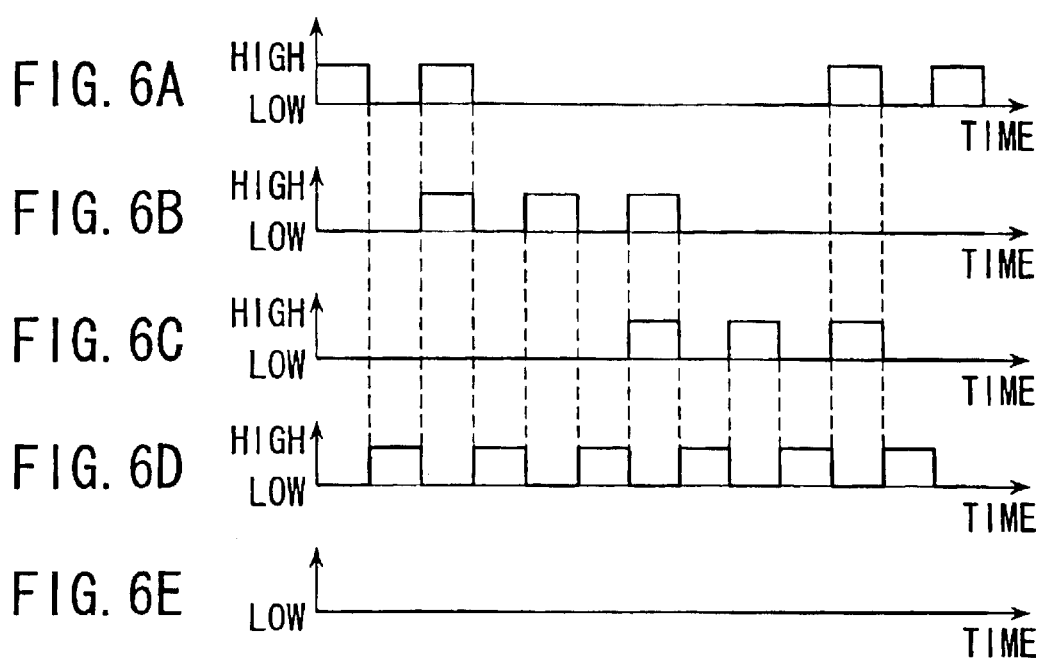
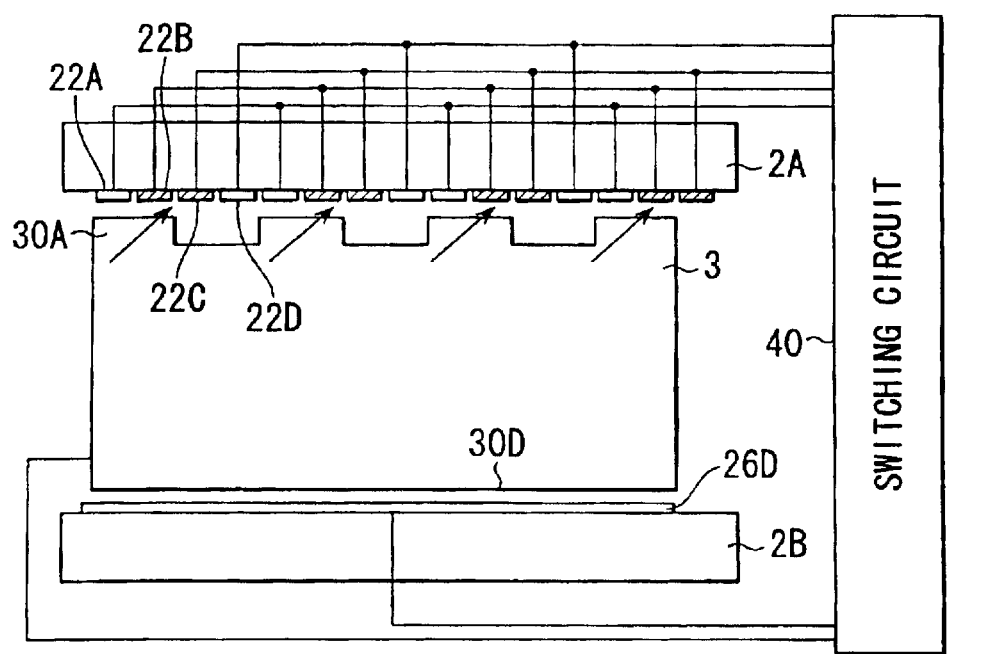
FIG. 7

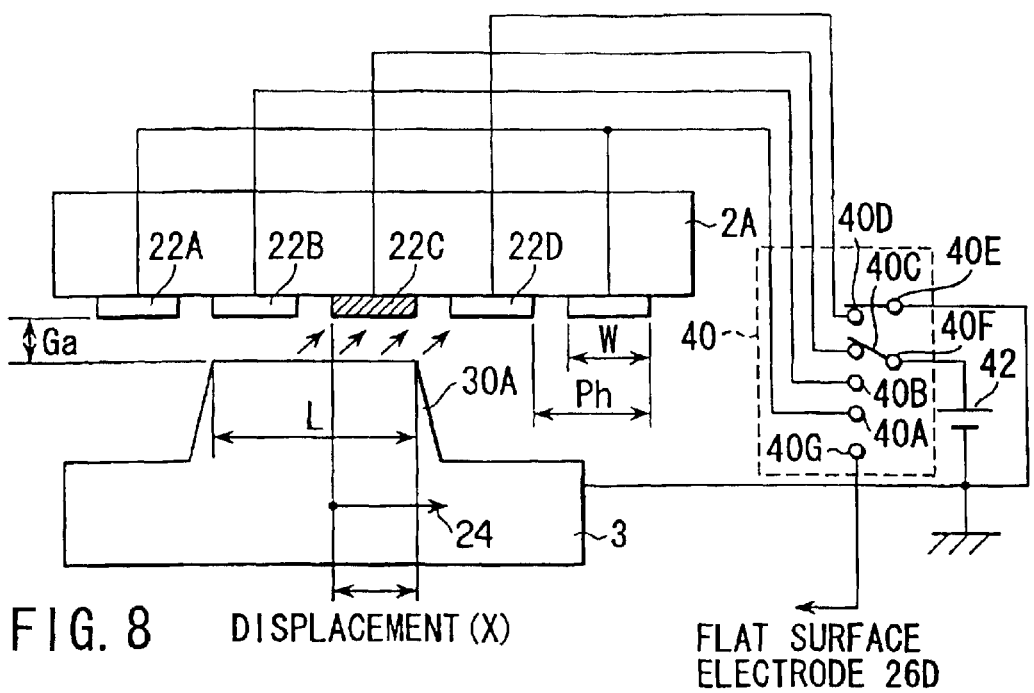
FIG. 8
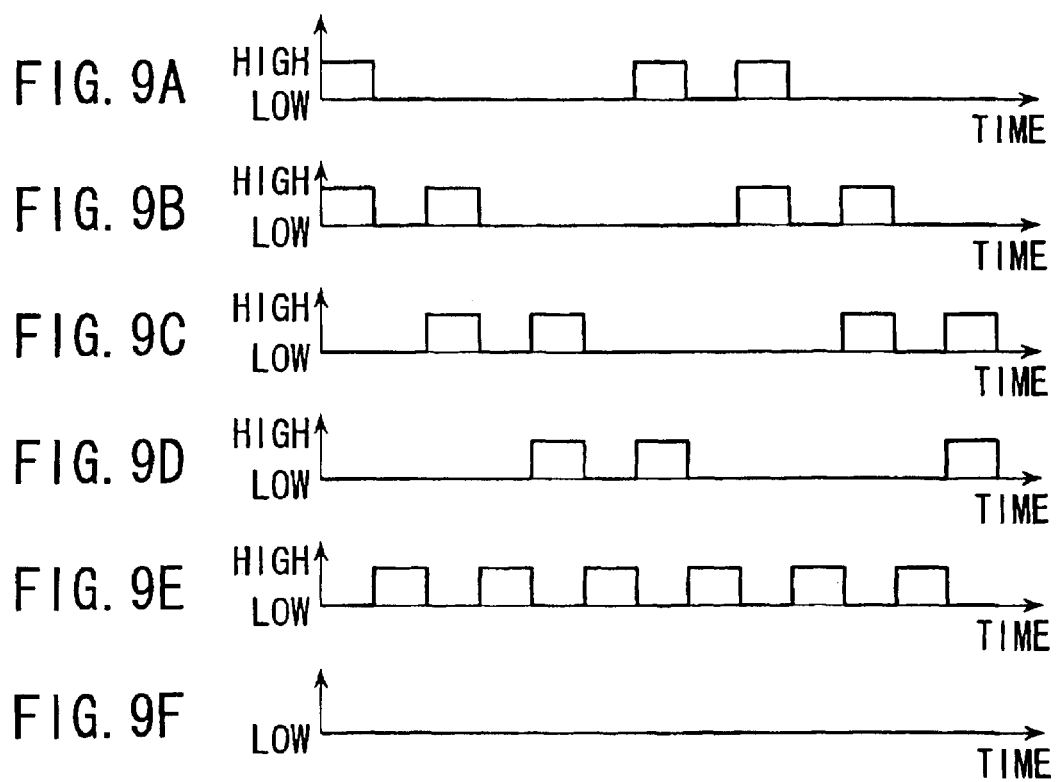
FIG. 9A
FIG. 9B
FIG. 9C
FIG. 9D
FIG. 9E
FIG. 9F

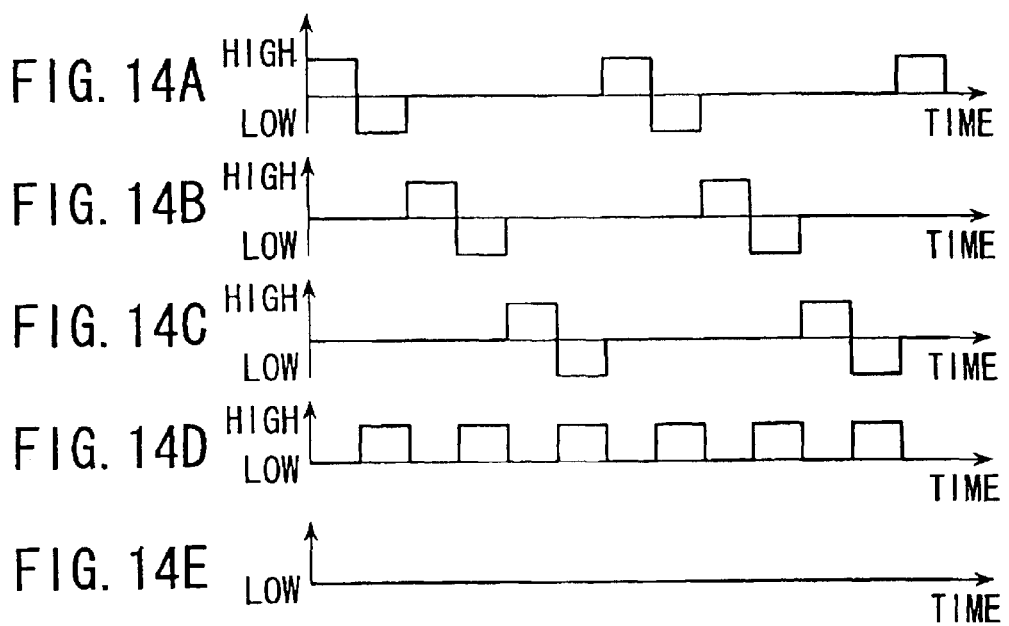
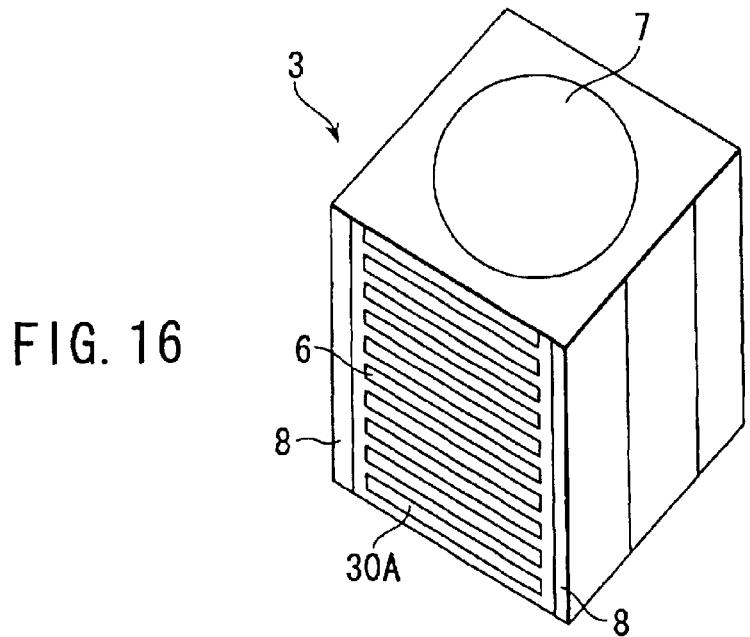
FIG. 16

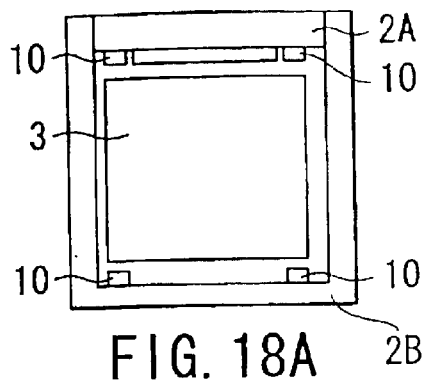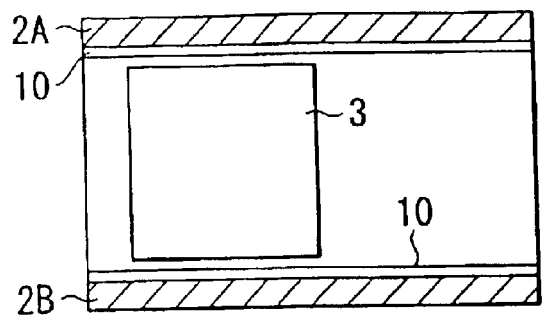
FIG. 18A    FIG. 18B
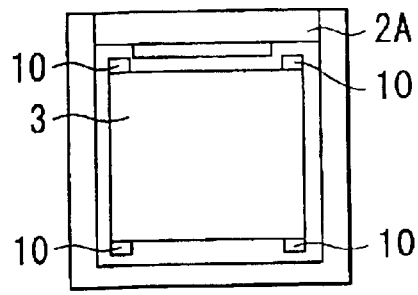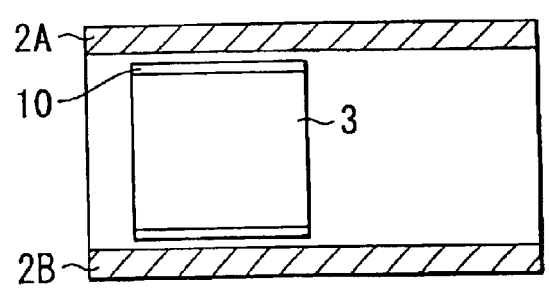
FIG. 19A    FIG. 19B
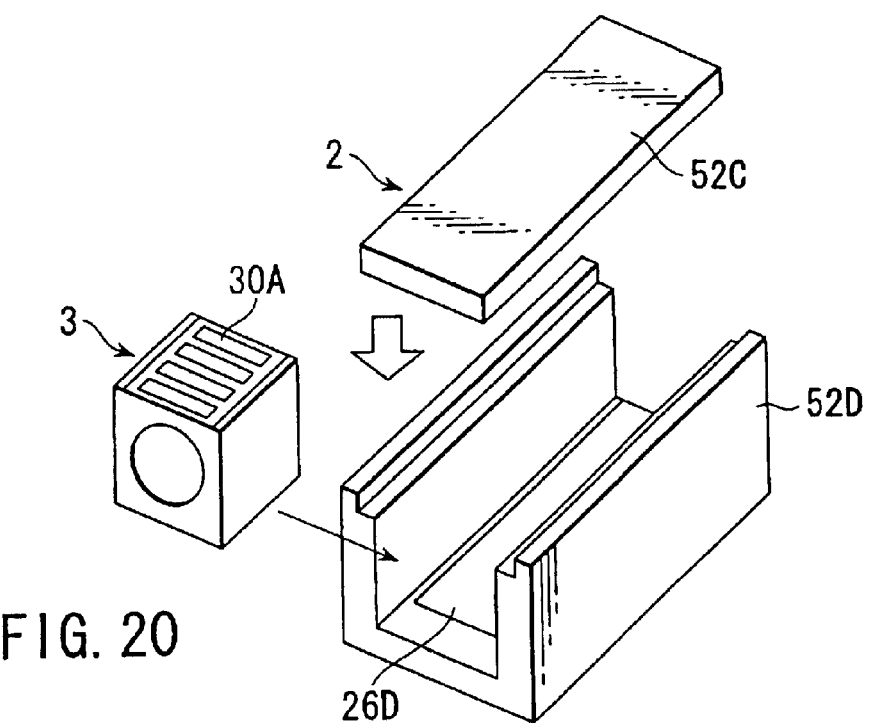
FIG. 20

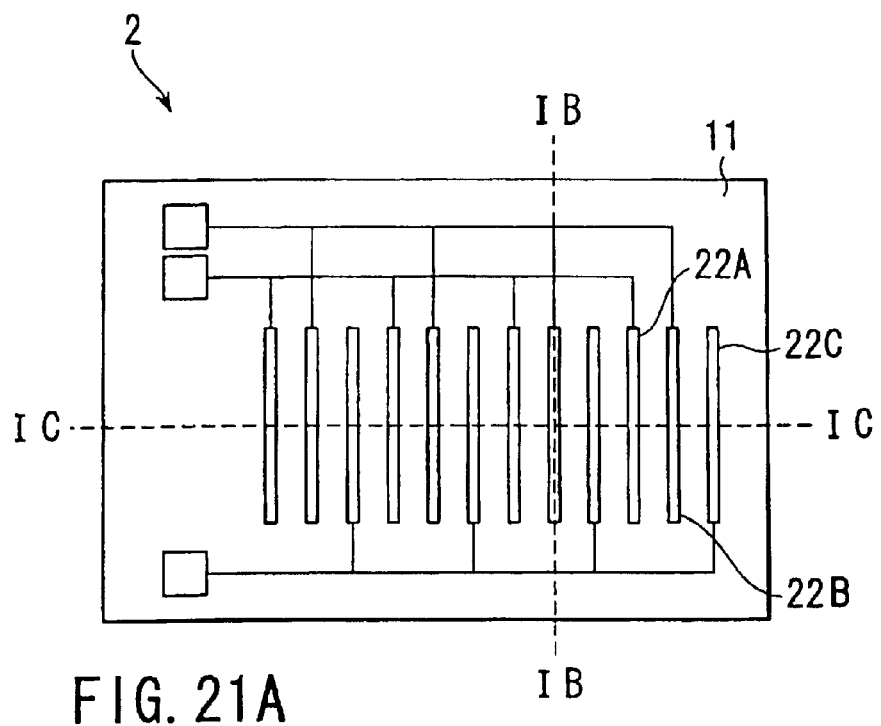
FIG. 21A   FIG. 21B
FIG. 21C

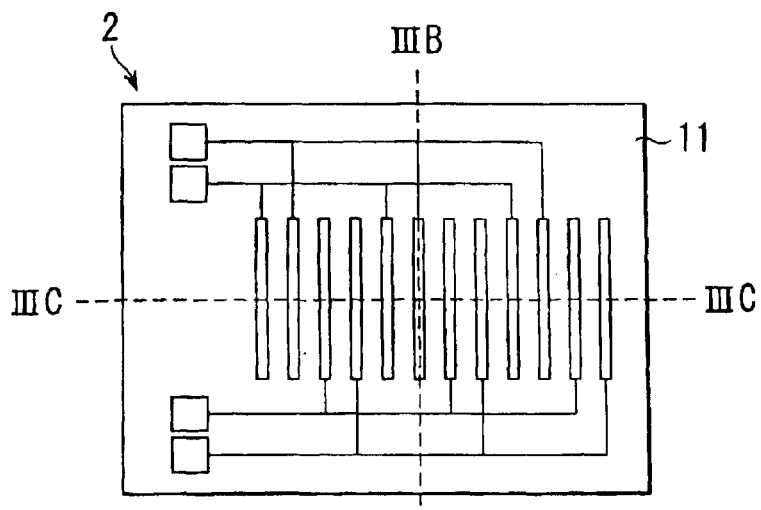
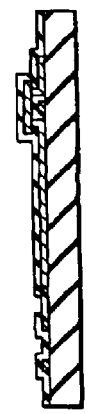
FIG. 23A    FIG. 23B
FIG. 23C
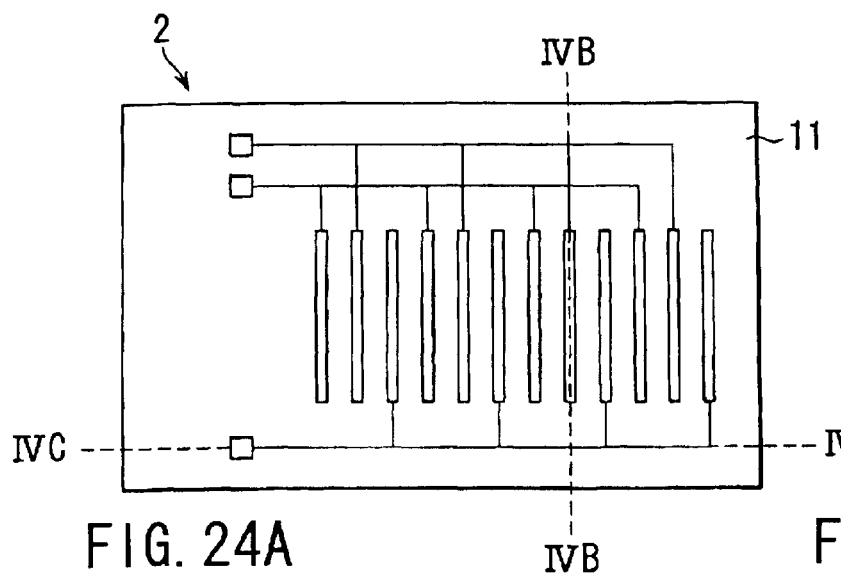
FIG. 24A    FIG. 24B
FIG. 24C

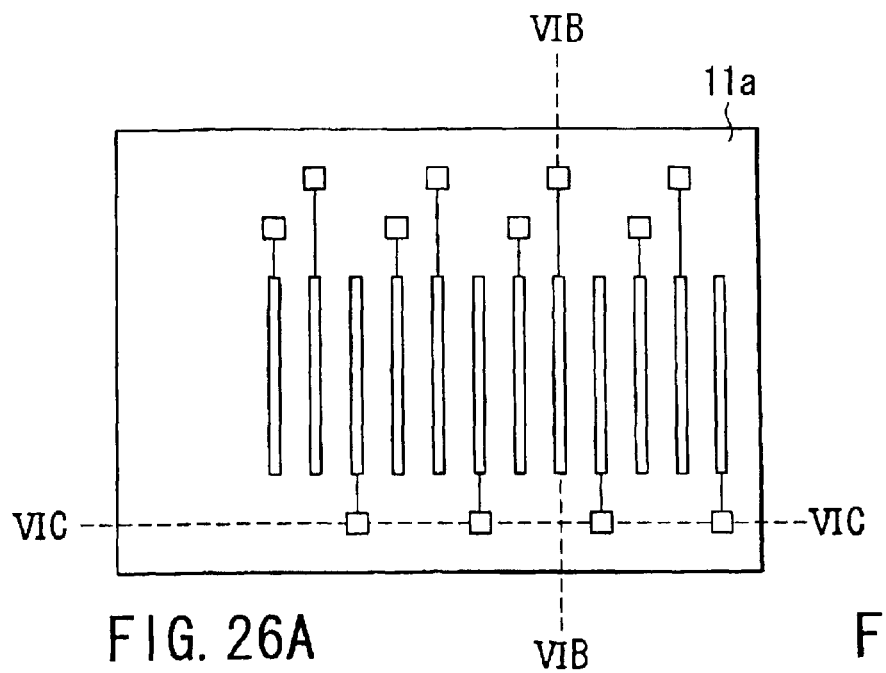
FIG. 26A  FIG. 26B
FIG. 26C
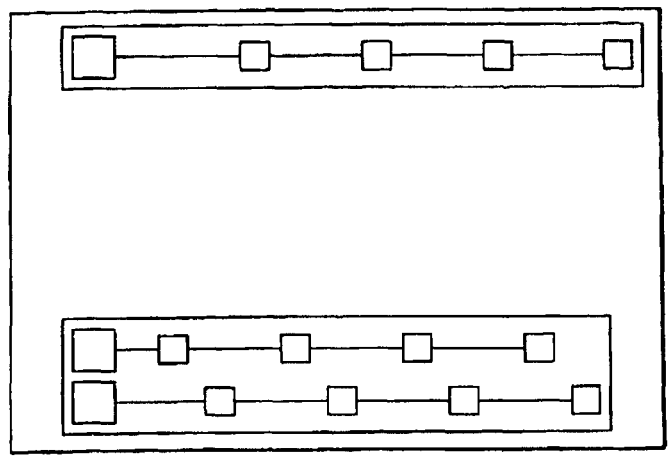
FIG. 26D

ELECTROSTATIC ACTUATOR AND METHOD OF DRIVING THE SAME

CROSS-REFERENCE TO RELATED APPLICATIONS

This application is a divisional application of Ser. No. 09/818,840 filed Mar. 28, 2001 now U.S. Pat. No. 6,670,738, which is now allowed, and claims priority to the Japanese Application no. 2000-094569, filed Mar. 30, 2000, the entire contents of which are incorporated herein by reference.

BACKGROUND OF THE INVENTION

The present invention relates to an electrostatic actuator for driving a slider or a movable section with an electrostatic force and a method of driving the same, particularly, to an electrostatic actuator having an improved simple structure and capable of driving the slider or the movable section with a high accuracy and a method of driving the same.

The electrostatic actuator for driving a slider or a movable section has already been disclosed in some publications, e.g., Japanese Patent Disclosure (Kokai) No. 8-140367, and "Electrostatic Linear Microactuator Mechanism, JOURNAL OF LIGHTWAVE TECHNOLOGY, Vol. 17, No. 1, January 1999, IEEE". The actuator disclosed in these publications comprises an array of electrodes as shown in FIG. 1. In this electrostatic actuator, a slider or a movable section 102 is arranged slidable forward as denoted by an arrow 101 or backward between two stators 103A and 103B arranged to face each other. An electrode section 104 is provided on the slider 102. Two systems of stator electrodes 106A and 106C to which voltage is applied at different timings are alternately arranged on the stator 103A. Likewise, two systems of electrodes 106B and 106D to which voltage is applied at different timings are arranged on the other stator 103B. The electrodes 106A to 106D provided on the stators 103A, 103B and the electrode section 104 of the slider 102 are substantially equal to each other in the pitch and the electrode width. Also, the electrodes 106A, 106C of the stator 103A and the electrodes 106B, 106D of the stator 103B are arranged such that the phase of the arrangement is shifted by ½.

If a voltage is applied from a voltage source (not shown) to the electrode 106A in the electrostatic actuator of the particular construction, an electrostatic force, i.e., Coulomb force, is generated between the electrode 106A and the electrode section 104, with the result that the slider 102 is attracted toward the stator 103A such that the electrode 106A and the electrode section 104 are allowed to faced to each other. Then, when the switching circuit (not shown) for supplying a voltage is switched to change the electrode to which a voltage is supplied from the electrode 106A to the electrode 106B so as to supply a voltage to the electrode 106B, the slider 102 is attracted toward the other stator 103B such that the electrodes 106B and the electrode section 104 are allowed to faced to each other. Also, when the switching circuit is switched to change the electrode to which a voltage is supplied from the electrode 106B to the electrode 106C so as to supply a voltage to the electrode 106C, the slider 102 is attracted toward the stator 103A again such that the electrodes 106C and the electrode section 104 are allowed to faced to each other. Further, when the switching circuit is switched to change the electrode to which a voltage is supplied from the electrode 106C to the electrode 106D so as to supply a voltage to the electrode 106D, the slider 102 is attracted toward the stator 103B again such that the electrodes 106D and the electrode section 104 are allowed to faced to each other. As described above, if a voltage is applied successively to the electrodes 106A, 106B, 106C and 106D, the slider 102 is vibrated microscopically between the stators 103A and 103B and is macroscopically driven in the forward direction as denoted by the arrow 101 in FIG. 1. If the order of applying a voltage to the electrodes is reversed such that the voltage is applied to the electrodes 106D, 106C, 106B and 106A in the order mentioned, the slider 102 is driven in the backward direction opposite to the forward direction denoted by the arrow 101 in FIG. 1.

In the electrostatic actuator described above, it is necessary for the pair of stators 103A and 103B to be aligned with a high accuracy. It is also necessary for the electrodes of the same width to be formed equidistantly with a high accuracy in the stators 103A, 103B. Naturally, a sufficient time and labor are required for manufacturing the parts of the electrostatic actuator and for assembling these parts with a high accuracy, leading to a high manufacturing cost of the actuator. This problem of the high manufacturing cost must be overcome for realizing a mass production of the actuator.

A method of applying voltage and the operating principle of the conventional electrostatic actuator will now be described with reference to FIG. 1. Incidentally, those members of the actuator, which are substantially same as those shown in FIG. 1 are denoted by the same reference numerals in FIG. 2 for avoiding the overlapping description.

As described above with reference to FIG. 1, if a voltage is applied successively to the electrodes 106A to 106D provided on the stators 103A and 103B, the slider 102 is driven so as realize a linear movement on a macroscopic level. In the electrostatic actuator shown in FIG. 2, the electrodes 106A and 106B are covered with a dielectric film 105 so as to prevent these electrodes 106A, 106B from the insulation breakdown, as disclosed in Japanese Patent Disclosure No. 8-140367 referred to previously.

If a voltage is applied first to the electrode 106A as shown in FIG. 2, dielectric polarization 107 is generated in a dielectric film 105 covering the electrode 106A. Then, if a voltage is applied to the electrode 106B, the slider 102 is attracted toward the other stator 103B so as to be driven such that the electrode section 104 is allowed to face the electrode 106B. It should be noted, however, that the component of the dielectric polarization generated in the dielectric film 105 mounted on the electrode 106A produces the function of keeping the slider 102 attracted toward the stator 103A. The component of the force produced by the dielectric polarization 107 is very small in terms of the potential level. However, since the distance between the stator 103A and the electrode section 104 of the slider 102 is short, it is possible for the force generated by the dielectric polarization 107 not to be negligible as a force for inhibiting the movement of the slider 102. This is based on the fact that the electrostatic force is inversely proportional to the square of the distance between the electrodes. Under the circumstances, the driving of the slider 102 tends to be unstable in the conventional electrostatic actuator. It should also be noted that the degree of the charge leakage in the dielectric film 105, i.e., the time for the dielectric polarization to disappear, is not constant, which also provides a cause of the failure for the movement of the slider 102 to be made constant.

As described above, in the conventional electrostatic actuator, it is necessary to align accurately the two stators 103A and 103B so as to provide accurately a desired phase of arrangement of these two stators. It is also necessary to form accurately the electrodes facing the two surfaces of the slider or movable element 102. It follows that a long time and much labor are required for assembling the actuator, leading to a high manufacturing cost. In other words, serious problems must be solved before the mass production of the actuator is realized.

It should also be noted that, in the conventional electrostatic actuator, the driving operation of the slider 102 tends to become unstable because of the influence produced by the dielectric polarization taking place in the dielectric film covering the electrode.

What should also be noted is that the degree of the charge leakage in the dielectric film 105, i.e., the time for the dielectric polarization to disappear, is not constant, which also provides a cause of the failure for the movement of the slider 102 to be made constant.

BRIEF SUMMARY OF THE INVENTION

An object of the present invention is to provide an electrostatic actuator, which permits improving the assembling efficiency and the mass production capability and also permits the slider to make a stable microscopic movement with a relatively high accuracy.

According to a first aspect of the present invention, there is provided an electrostatic actuator mechanism, comprising:

a first stator provided with an electrode group including at least three electrodes successively arranged in a predetermined direction, voltage being applied to the electrodes in different order;

a second stator arranged to face the first stator and provided with a planar electrode extending in the predetermined direction;

a movable member arranged between the first stator and the second stator, and provided with a first electrode section facing the electrode group and a second electrode section facing the planar electrode; and a switching circuit configured to apply voltage alternately to the electrode group and the planar electrode, the potential of any of the electrodes forming the electrode group being rendered higher than the potential of the first electrode section, or the potential of the planar electrode being rendered higher than the potential of the second electrode section, and to switch the order of applying voltage successively to the first electrode group.

It is possible for the electrostatic actuator of the present invention to further comprise a dielectric film formed to cover the electrode group.

It is also possible for the electrostatic actuator of the present invention to further a dielectric film formed to cover the first electrode section.

Further, where the dielectric film is formed, it is possible for the electrostatic actuator of the present invention to further comprise a circuit configured to impair a potential difference such that the potential of the electrode group is rendered lower than the potential of the first electrode section, when voltage is applied to the planar electrode.

It is possible for that the slider having a surface which is perpendicular to the predetermined direction to form an optical element surface.

It is possible for the first and second stators to have stoppers projecting from the upper surfaces of the electrode group and the planar electrode, and for the movable member to be provided with regions in which the stoppers are slid, the region being formed on the surfaces on which the first and second electrode sections are formed.

Also, it is possible for the movable member to have stoppers projecting from the surfaces of the first and second electrode sections, and for the first and second stators to be provided with regions in which the stoppers are slid, the regions being formed on the surfaces on which the electrode group and the planar electrode are formed.

Further, it is possible for the first stator to include a first part and for the second stator to include a second part, the first and second parts being connected to each other to form a stator.

According to a second aspect of the present invention, there is provided a method of driving an electrostatic actuator mechanism including a first stator having an electrode group including at least three electrodes successively arranged in a predetermined direction, voltage being applied to the electrodes in different order, a second stator arranged to face the first stator and having a planar electrode extending in the predetermined direction, and a movable member arranged between the first stator and the second stator and having a first electrode section facing the electrode group and a second electrode section facing the planar electrode, the method comprising:

applying voltage to the electrode group, the potential of any of the electrodes forming the electrode group being rendered higher than the potential of the first electrode section;

applying voltage to the planar electrode, the potential of the planar electrode being rendered higher than that of the second electrode section;

applying voltage by switching the electrode of the first electrode group such that the potential of the switched electrode is rendered higher than the potential of first electrode section;

applying voltage such that the potential of the planar electrode is rendered higher than the potential of the second electrode section; and repeating the voltage application defined above.

Further, according to a third embodiment of the present invention, there is provided a camera module, comprising:

a image pick-up element; and an electrostatic actuator mechanism mounted to the image pick-up element, the electrostatic actuator mechanism including;

a first stator provided with an electrode group including at least three electrodes successively arranged in a predetermined direction, voltage being applied to the electrodes in different order, a second stator arranged to face the first stator and provided with a planar second electrode extending in the predetermined direction, a movable member arranged between the first stator and the second stator, and provided with a first electrode section facing the electrode group, a second electrode section facing the planar electrode, and an optical element configured to form an optical image on the image pick-up element, and a switching circuit configured to apply voltage alternately to the electrode group and the planar electrode, the potential of any of the electrodes forming the electrode group being rendered higher than the potential of the first electrode section, or the potential of the planar electrode being rendered higher than the potential of the second electrode section, and to switch the order of applying voltage successively to the electrode group.

BRIEF DESCRIPTION OF THE SEVERAL VIEWS OF THE DRAWING

FIG. 3 is a block diagram schematically showing the construction of an electrostatic actuator according to one embodiment of the present invention;

FIGS. 4A to 4E are timing charts each showing a voltage signal applied to the electrodes of the electrostatic actuator shown in FIG. 3;

FIGS. 5A to 5E are cross sectional views collectively showing how to drive the electrostatic actuator according to a modification of the embodiment shown in FIG. 3;

FIGS. 6A to 6E are timing charts each showing a voltage signal applied to the electrodes of the electrostatic actuator in relation to the driving method shown in FIGS. 5A to 5E;

FIG. 7 is a cross sectional view schematically showing the construction of an electrostatic actuator according to another modified embodiment of the present invention;

FIG. 8 is a cross sectional view for schematically explaining the operating principle of the electrostatic actuator shown in FIG. 7;

FIGS. 9A to 9F are timing charts each showing a voltage signal applied to the electrodes of the electrostatic actuator shown in FIGS. 7 to 8;

FIGS 14A to 14E are timing charts each showing a voltage signal applied to the electrodes of the electronic actuator shown in FIGS. 13A and 13B;

FIG. 16 is a perspective view schematically showing another modified embodiment of the electrostatic actuator shown in FIG. 3;

FIGS. 18A and 18B are a cross sectional view and a broken view, respectively, schematically showing collectively the construction of an electrostatic actuator provide with a stopper according to another embodiment of the present invention;

FIGS. 19A and 19B are a cross sectional view and a broken view, respectively, schematically showing collectively the construction of an electrostatic actuator provide with a stopper according to another embodiment of the present invention;

FIG. 20 is a perspective view schematically showing in a dismantled fashion the construction of an electrostatic actuator provided with a stopper according to another modified embodiment of the present invention;

FIGS. 21A to 21C are a plan view and cross sectional views collectively showing schematically the construction of the stator of an electrostatic actuator according to another embodiment of the present invention;

FIGS. 23A to 23C are a plan view and two cross sectional views collectively showing schematically the construction of the stator of an electrostatic actuator according to another embodiment of the present invention;

FIGS. 24A to 24C are a plan view and two cross sectional views collectively showing schematically the construction of the stator of an electrostatic actuator according to another embodiment of the present invention;

FIGS. 26A to 26D are a plan view, two cross sectional views, and a back view collectively showing schematically the construction of the stator of an electrostatic actuator according to another embodiment of the present invention;

DETAILED DESCRIPTION OF THE INVENTION

Figure 1:
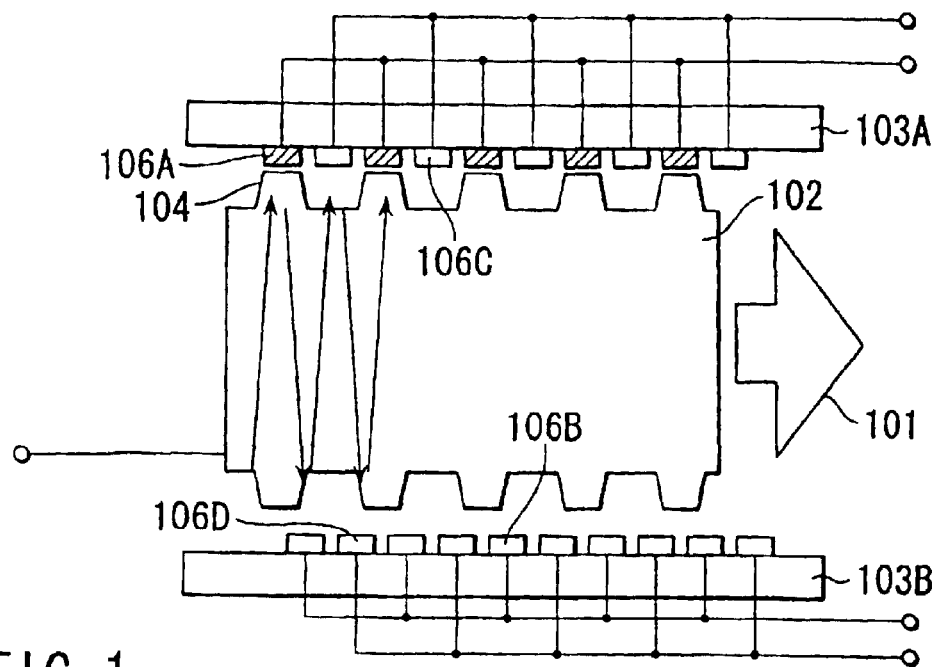
FIG. 1 a cross sectional view schematically showing the construction of a conventional electrostatic actuator.
Figure 2:
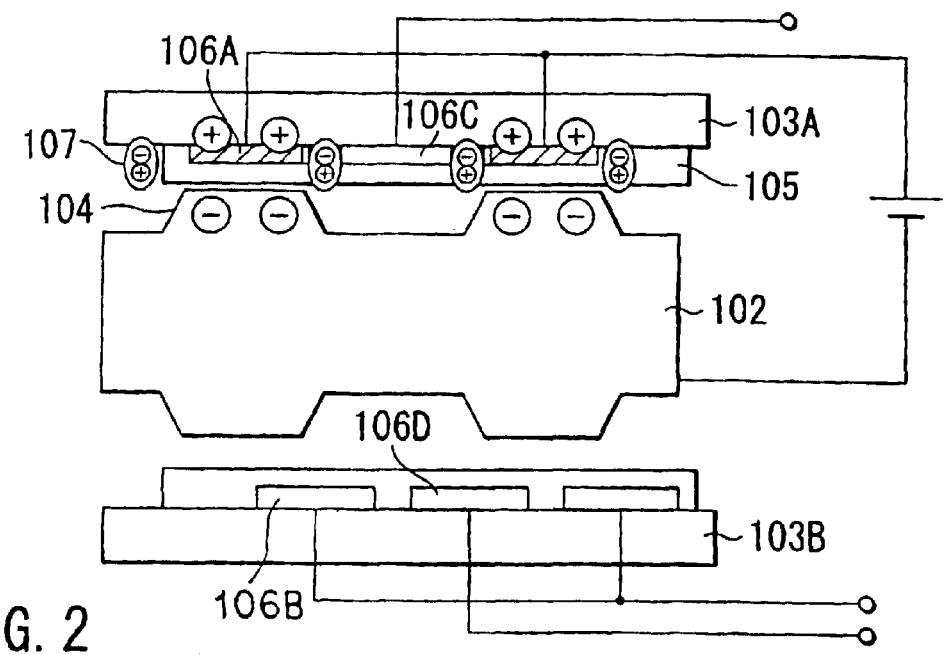
FIG. 2 is a cross sectional view schematically showing the construction of a conventional electrostatic actuator provided with a dielctric film.

Preferred embodiments of an electrostatic actuator of the present invention will now be described in detail with reference to the accompanying drawings.

Specifically, FIGS. 3 to 6 show an electrostatic actuator according to one embodiment of the present invention. In the electrostatic actuator shown in FIG. 3, a first stator 2A and a second stator 2B are arranged to face each other, and a slider or movable section 3 is slidably arranged between the first and second stators 2A and 2B. It is possible for the first and second stators 2A and 2B to be shaped like a flat plate or like a semicircular cylindrical plate. Where the first and second stators 2A and 2B are shaped like a flat plate, the slider 3 is in the form of a block or a hollow block having flat surfaces facing the first and second stators 2A and 2B. Where the first and second stators 2A and 2B are shaped like a semicircular cylindrical plate, the slider 3 is in the form of a column or a hollow cylinder conforming with the shapes of the first and second stators 2A and 2B.

The electrostatic actuator shown in FIG. 3 comprises a first stator 2A having a three line type construction in which a driving signal is supplied at a different timing to the three stator electrodes 22A, 22B, 22C through three electrical signal lines. Specifically, each of the first, second and third striped stator electrodes 22A, 22B, 22C has a comb like shape and the first, second and third striped stator electrodes 22A, 22B, 22C are alternately arranged on the surface of the first stator 2A in the sliding direction of the slider 3, i.e., in a forward direction 24 and a backward direction opposite to the forward direction 24. In addition, these first, second and third stator electrodes 22A, 22B, 22C are arranged at the same pitch Ph. These first, second and third stator electrodes 22A, 22B, 22C are arranged over a range within which at least the slider 3 is slid. On the other hand, an extended surface electrode 26D that extends flat is formed on the surface of the second stator 2B in a manner to extend flat.

The slider 3 has a surface facing the first stator 2A, and first slider electrodes 30A are arranged on the surface of the slider 3 in a manner to face the first stator 2A at a pitch Ph equal to the pitch Ph at which the first, second and third stator electrodes 22A, 22B, 22C are arranged. The slider 3 also has a surface facing the second stator 2B, and the second slider electrode 30D that extends flat is formed on the particular surface of the slider 3.

The first, second and third stator electrodes 22A, 22B, 22C are alternatively arranged in this order, with the phase of the arrangement (phase of the arrangement in which the arranging pitch corresponds to 3 Ph) of the electrodes deviated by ⅓ (=Ph). Also, the first slider electrodes 30A of the slider 3 may be formed by forming projections and recesses on the surface of a conductor, as shown in FIG. 3. Alternatively, it is possible to form the first slider electrodes 30A by uniformly forming a conductive material layer on a flat surface, followed by patterning the conductive material layer in a desired pitch.

As shown in FIG. 3, the first, second, third stator electrodes 22A, 22B, 22C, the extended surface electrode 26D, and the second slider electrode 30D are connected to a voltage source 42 generating a voltage via a switching circuit 40 serving to determine the timing at which a voltage is applied to these stator electrodes 22A, 22B, 22C, and the extended electrode 26D. Also, the first slider electrode 30A and the second slider electrode 30D are connected to the ground via the switching circuit 40 or are connected to a negative potential point. The switching circuit 40 is substantially equal in the circuit construction to the circuit shown in FIG. 8, which is to be referred to herein later. Specifically, the switching circuit 40 comprises a stationary contact or a grounded contact connected to the stator electrodes 22A, 22B, 22C and the extended electrode 26D, a first movable contact connected to a voltage source 42, which is connected to these stationary contacts, and a second movable contact that is grounded to connected to a negative potential point. When one of these stationary contacts is connected to the voltage source 42 via the first movable contact in the switching circuit 40 of the particular construction, the other stationary contacts are connected to the ground via the second movable contact or connected to a negative potential point.

In the electrostatic actuator shown in FIG. 3, the slider 3 is moved in the forward direction 24 or a backward direction opposite to the forward direction 24 by the driving principle described below.

In the first step, a voltage, i.e., a high level voltage or potential, is applied to the first stator electrode 22A mounted to the stator 2A as shown in FIG. 4A, and the first slider electrode 30A and the second slider electrode 30B mounted to the slider 3 are connected to the ground or maintained at a potential lower than a potential on the stator electrode 22A, i.e., a low level voltage or potential as shown in FIG. 4E. If the potential of the first stator electrode 22A is set higher than the potential of the first slider electrode 30A mounted to the slider 3, and if the other stator electrodes 22B, 22C, and the second slider electrode 30D are connected to the ground or to a low level voltage or potential point, an electrostatic force, i.e., Coulomb force, is generated between the first stator electrode 22A and the first slider electrode 30A, with the result that the slider 3 is attracted toward the first stator 22A such that the first slider electrode 30A is attracted toward the stator electrode 22A. To be more specific, since the state that the first stator electrode 22A and the first slider electrode 30A are allowed to exactly overlap each other is most stable, the slider 3 receives force from the first stator electrode 22A such that the first stator electrode 22A and the first slider electrode 30A are allowed to face each other as denoted by an arrow 44. Then, if the voltage-applying electrode is switched from the first stator electrode 22A to the extended electrode 26D, which extends flat, by the operation of the switching circuit 40, a high level voltage is applied to the extended electrode 26D and the other electrodes are maintained at a low level voltage, as shown in FIG. 4D. As a result, the slider 3 is moved away from the first stator electrode 22A so as to be attracted toward the second stator 2B.

Also, if the voltage-applying electrode is switched from the extended electrode 26D to the stator electrode 22B mounted to the stator 2 by the operation of the switching circuit 40, a voltage is applied to the second stator electrode 22B, as shown in FIG. 4B. As a result, an electrostatic force, i.e., Coulomb force, is generated between the second stator electrode 22B and the first slider electrode 30A as denoted by an arrow 46, as in the case where a voltage is applied to the first stator electrode 22A, thereby attracting the slider 3 toward the first stator 2A such that the first slider electrode 30A is allowed to overlap with the stator electrode 22B. If the voltage-applying electrode is switched in the next step from the second stator electrode 22B to the extended electrode 26D by the operation of the switching circuit 40, as shown in FIG. 4D, the slider 3 is moved away from the second stator electrode 22B so as to be attracted toward the second stator 2B.

Further, if the voltage-applying electrode is switched from the extended electrode 26D to the third stator electrode 22C by the operation of the switching circuit 40, a voltage is applied to the third stator electrode 22C, as shown in FIG. 4C. As a result, an electrostatic force, i.e., Coulomb force, is generated between the third stator electrode 22C and the electrode 30A as in the case of applying a voltage to each of the first and second stator electrodes 22A and 22B, with the result that the slider 3 is attracted toward the first stator electrode 22A such that the electrode 30A is allowed to overlap with the electrode 22C. Then, if the voltage-applying electrode is switched from the third stator electrode 22C to the extended electrode 26D by the operation of the switching circuit 40, a voltage is applied to the extended electrode 26D, with the result that the slider 3 is moved away from the third stator electrode 22C so as to be attracted toward the second stator 2B.

If the sequence of the voltage application, in which the voltage is applied to the first stator electrode 22A, the extended electrode 26D, the second stator electrode 22B, the extended electrode 226D, the third stator electrode 22C and the extended electrode 26D in the order mentioned and, then, to the first stator electrode 22B, again, as described above, is repeated as shown in FIGS. 4A to 4D, the slider 3 is moved in the forward direction 24, i.e., in the direction of arrangement of the electrodes mounted to the first stator 2A on a macroscopic level, while the slider 3 is vibrated in a direction crossing the forward direction 24 on a microscopic level.

In the sequence described above, the slider 3 is moved in the forward direction 24. Where the slider 3 is moved in a backward direction opposite to the forward direction 24, a voltage is applied to the electrodes in the order opposite to that described above. Specifically, a voltage is applied first to the third stator electrode 22C as shown in FIG. 4C, with the first slider electrode 30A and the second slider electrode 30D maintained at a low level potential as shown in FIG. 4E. It follows that the slider 3 is attracted toward the first stator 2A by the electrostatic force, i.e., Coulomb force, generated between the third stator electrode 22C and the electrode 30A such that the electrode 30A is attracted toward the electrode 22C. Then, the voltage-applying electrode is switched from the third stator electrode 22C to the extended electrode 26C by the operation of the switching circuit 40 so as to apply a voltage to the extended electrode 26D as shown in FIG. 4D, with the result that the slider 3 is moved away from the third stator electrode 22C so as to be attracted toward the second stator 2B.

Then, the voltage-applying electrode is switched from the extended electrode 26D to the second stator electrode 22B by the operation of the switching circuit 40 so as to apply a voltage to the second stator electrode 22B as shown in FIG. 4B, with the result that the slider 3 is attracted toward the first stator 2A by the electrostatic force generated between the second stator electrode 22B and the first slider electrode 30A. Further, the voltage-applying electrode is switched from the second stator electrode 22B to the extended electrode 26D by the operation of the switching circuit 40 so as to apply a voltage to the extended electrode 26D as shown in FIG. 4D, with the result that the slider 3 is moved away from the second stator electrode 22B so as to be attracted toward the second stator 2B.

In the next step, the voltage-applying electrode is switched from the extended electrode 26D to the first stator electrode 22A by the operation of the switching circuit 40 so as to apply a voltage to the first stator electrode 22A as shown in FIG. 4A, with the result that the slider 3 is attracted toward the first stator 2A by the electrostatic force generated between the first stator 22A and the electrode 30A. Then, the voltage-applying electrode is switched from the first stator electrode 22A to the extended electrode 26D by the operation of the switching circuit 40 so as to apply a voltage to the extended electrode 26D as shown in FIG. 4D, with the result that the slider 3 is moved away from the third stator electrode 22C so as to be attracted toward the second stator 2B.

In the sequence of the movement of the slider 3 in the backward direction described above, a voltage is applied to the third stator electrode 22C, the extended electrode 26D, the second stator electrode 22B, the extended electrode 26D, the first stator electrode 22A and the extended electrode 26D in the order mentioned and, then, the voltage is applied again to the third stator electrode 22C. If the sequence described above is repeated, the slider 3 is moved in a direction opposite to the forward direction 24, i.e., in the direction of the arrangement of the electrodes mounted to the first stator 2A, while the slider 3 is vibrated in a direction crossing the forward direction 24.

In the electrostatic actuator described above, the extended electrode 26D mounted to the second stator 2B is a single electrode of a simple structure, which simply extends flat. Therefore, the alignment between the extended electrode 26D and the first to third stator electrodes 22A, 22B, 22C is not required. Also, the electrostatic actuator is simple in construction, leading to improvements in the assembling operation and in the mass production capability.

A method of driving an electrostatic actuator according to a modification of the embodiment described above will now be described with reference to FIGS. 5A to 5E and 6A to 6E.

Specifically, FIGS. 5A to 5E are directed to a method of driving the electrostatic actuator shown in FIG. 3, which is directed to a modified embodiment of the present invention, and show the relationship between the timing of the voltage application to the electrodes and the movement of the slider 3.

In the first step, a voltage is applied to the first stator electrode 22A, as shown in FIG. 6A, with the first slider electrode 30A and the second slider electrode 30D maintained at a low level, as shown in FIG. 6E. As a result, the slider 3 is attracted toward the first stator 2A such that the first slider electrode 30A is pulled by the first stator electrode 22A by the electrostatic force generated between the first stator electrode 22A and the electrode 30A, as shown in FIG. 5A. Then, the voltage-applying electrode is switched from the first stator electrode 22A to the extended electrode 26D by the operation of the switching circuit 40 so as to apply a voltage to the extended electrode 26D as shown in FIG. 6D, with the result that the slider 3 is moved away from the third stator electrode 22C so as to be attracted toward the second stator 2B, as shown in FIG. 5B.

In the next step, the voltage-applying electrode is switched from the extended electrode 26D to the first and second stator electrodes 22A, 22B by the operation of the switching circuit 40 so as to apply a voltage to the first and second stator electrodes 22A, 22B as shown in FIGS. 6A and 6B, with the result that the slider 3 is attracted toward the first stator 2A by the electrostatic force generated between the first and second stator electrodes 22A, 22B and the first slider electrode 30A, as shown in FIG. 5C. It should be noted that, since a voltage is applied to both the first and second stator electrodes 22A and 22B as shown in FIGS. 6A and 6B, the slider 3 is attracted toward the first stator 2A such that the first slider electrode 30A is positioned to face the first and second stator electrodes 22A, 22B, as shown in FIG. 5C. Then, the voltage-applying electrode is switched from the first and second stator electrodes 22A, 22B to the extended electrode 26D by the operation of the switching circuit 40 so as to apply a voltage to the extended electrode 26D as shown in FIG. 6D, with the result that the slider 3 is moved away from the first and second stator electrodes 22A, 22B so as to be attracted toward the second stator 2B, as shown in FIG. 5D.

Further, the voltage-applying electrode is switched from the extended electrode 26D to the second stator electrode 22B by the operation of the switching circuit 40 so as to apply a voltage to the second stator electrode 22B as shown in FIG. 6B, with the result that the slider 3 is attracted toward the first stator 2A by the electrostatic force generated between the second stator electrode 22B and the first slider electrode 30A, as shown in FIG. 5E. Then, the voltage-applying electrode is switched from the second stator electrode 22B to the extended electrode 26D by the operation of the switching circuit 40 so as to apply a voltage to the extended electrode 26D as shown in FIG. 6D, with the result that the slider 3 is moved away from the second stator electrode 22B so as to be attracted toward the second stator 2B.

Further, the voltage-applying electrode is switched from the extended electrode 26D to the second and third stator electrodes 22B, 22C by the operation of the switching circuit 40 so as to apply a voltage to the second and third stator electrodes 22B, 22C as shown in FIGS. 6B and 6C, with the result that the slider 3 is attracted toward the first stator 2A by the electrostatic force generated between the second and third stator electrodes 22B, 22C and the first slider electrode 30A. It should be noted that, since a voltage is applied to both the second and third stator electrodes 22B and 22C, the slider 3 is attracted toward the first stator 2A such that the first slider electrode 30A is positioned to face the second and third stator electrodes 22B and 22C. Then, the voltage-applying electrode is switched from the second and third stator electrodes 22B, 22C to the extended electrode 26D by the operation of the switching circuit 40 so as to apply a voltage to the extended electrode 26D as shown in FIG. 6D, with the result that the slider 3 is moved away from the second and third stator electrodes 22B, 22C so as to be attracted toward the second stator 2B.

In the next step, the voltage-applying electrode is switched from the extended electrode 26D to the third stator electrode 22C by the operation of the switching circuit 40 so as to apply a voltage to the third stator electrode 22C as shown in FIG. 6C, with the result that the slider 3 is attracted toward the first stator 2A by the electrostatic force generated between the third stator electrode 22C and the first slider electrode 30A. Then, the voltage-applying electrode is switched from the third stator electrode 22C to the extended electrode 26d by the operation of the switching circuit 40 so as to apply a voltage to the extended electrode 26D as shown in FIG. 6D, with the result that the slider 3 is moved away from the second stator electrode 22B so as to be attracted toward the second stator 2B.

Then, the voltage-applying electrode is switched from the extended electrode 26D to the third and first stator electrodes 22C, 22A so as to apply a voltage to the third and first stator electrodes 22C, 22A as shown in FIGS. 6A and 6C, with the result that the slider 3 is attracted toward the first stator 2A by the electrostatic force generated between the third and first stator electrodes 22C, 22A and the first slider electrode 30A. It should be noted that, since a voltage is applied to both the third and first stator electrodes 22C and 22A, the slider 3 is attracted toward the first stator 2A such that the first slider electrode 30A is positioned to face the third and first stator electrodes 22C, 22A. Then, the voltage-applying electrode is switched from the third and first stator electrodes 22C, 22A to the extended electrode 26D by the operation of the switching circuit 40 so as to apply a voltage to the extended electrode 26D as shown in FIG. 6D, with the result that the slider 3 is moved away from the second and third stator electrodes 22C, 22A so as to be attracted toward the second stator 2B.

As described previously, if a voltage is applied to the first stator electrode 22A as shown in FIG. 6A, the slider 3 is attracted toward the first stator 2A by the electrostatic force generated between the first stator electrode 22A and the first slider electrode 30A.

As described above, a voltage is applied successively to the first stator electrode 22A, the extended electrode 26d, both the first and second stator electrodes 22A and 22B, the extended electrode 26D, the second stator electrode 22B, the extended electrode 26D, both the second and third stator electrodes 22B and 22C, the extended electrode 26D, the third stator electrode 22C, the extended electrode 26D, both the third and first stator electrodes 22C and 22A, the extended electrode 26D, and the first stator electrode 22A in the order mentioned, with the result that the slider 3 is moved in the direction denoted by the arrow in which the electrodes are arranged in the first stator 30A while the slider 3 is being slightly vibrated in a direction perpendicular to the direction denoted by the arrow 24.

In the modified embodiment described above, the slider 3 is attracted first by one of the electrodes, e.g., the first stator electrode 22A, mounted to the first stator 2A and, then, the slider 3 is attracted by the two adjacent electrodes, e.g., the first and second stator electrodes 22A and 22B, with the result that the first slider electrode 30A receives force that permits the first slider electrode 30A to be positioned in substantially the center between the two adjacent stator electrodes to which a voltage is applied. According to this driving method, the force for driving the slider 3 in a direction crossing the direction in which the slider 3 is moved is rendered relatively large, with the result that the movement of the slider is made smoother.

Incidentally, in the modified embodiment described above with reference to FIG. 3 and FIGS. 5A to 5E, three electrodes are mounted to the first stator 2A. However, the present invention is not limited to the particular modification. In other words, it is possible to mount more than three electrodes, e.g., four electrodes, to the first stator 2A. FIG. 7 shows an electrostatic actuator according to a modified embodiment of the present invention, in which first to fourth stator electrodes 22A to 22D are mounted, in place of the three first stator electrodes shown in FIG. 3, to the first stator 2A and a single extended electrode 26D is mounted to the second stator 2B.

In the electrostatic actuator shown in FIG. 7, the fourth stator electrode 24D is mounted to the first stator 2A in addition to the first to third stator electrodes 22A, 22B, 22C shown in FIG. 3. These first to fourth stator electrodes 22A, 22B, 22C and 22D are arranged at the same pitch, and a plurality of slider electrodes 30A having the widths corresponding to the widths of the four stator electrodes 22A, 22B, 22C, 22D are arranged in the slider 3 in the forward direction. Also, the extended electrode 30D, which is uniform over the movable range of the slider 3, is mounted to the surface of the stator electrode 2B facing the stator 2B.

As shown in FIG. 8, a voltage source 42 generating a voltage is connected to the first, second, third and fourth stator electrodes 22A, 22B, 22C, 22D, the extended electrode 26D, the first slider electrode 30A and the second slider electrode 30D via the switching circuit 40 serving to determine the timings of applying a voltage to these stator electrodes 22A, 22B, 22C, 22D and the extended electrode 26D. Also, the first slider electrode 30A and the second stator electrode 30D are connected to the ground through the switching circuit 40 or are connected to negative potential point. As shown in FIG. 8, the switching circuit 40 comprises a stationary contacts 40A, 40B, 40C, 40D and a stationary contact 40G connected to the ground, the stationary contacts being connected to the stator electrodes 22A, 22B, 22C, 22D and the extended electrode 26D, respectively, a first movable contact 40F connected to the voltage source 42, the circuit 40 being connected these stator contacts 40A, 40B, 40C, 40D, and a second movable contact 40E connected to the ground or to a negative voltage point. When one of these stationary contacts 40A, 40B, 40C, and 40B is connected to the voltage source 42 through the movable contact 40F in the switching circuit 40 of the particular construction, the other stationary contacts 40A, 40B, 40C, 40D are connected to the ground via the second movable contact 40E or is connected to a negative potential point.

In this electrostatic actuator, a voltage is applied successively to the first stator electrode 22A, the extended electrode 26D, the second stator electrode 22B, the extended electrode 26D, the third stator electrode 22C, the extended electrode 26D, the fourth stator electrode 22D, the extended electrode 26D and, then, the first stator electrode 22A in the order mentioned, as described previously in conjunction with FIGS. 3 and 4A to 4E. As a result, the slider 3 is linearly moved in the direction of the arrangement of the stator electrodes mounted to the first stator 2A, i.e., forward direction 24, on a macroscopic level, while the slider 3 is being vibrated in a direction crossing the forward direction on a microscopic level.

In the actuator shown in FIG. 8, it is possible to permit the slider 3 to be moved slightly in the forward direction or the backward direction by applying the voltage to the stationary contacts 40A, 40B, 40C and 40D at the timings shown in FIGS. 9A to 9F. To be more specific, the first slider electrode 30A and the second slider electrode 30D are maintained first at a low level voltage as shown in FIG. 9F, and a voltage is applied to the first and second stator electrodes 22A and 22B as shown in FIGS. 9A and 9B. As a result, the slider 3 is attracted toward the first stator 2A by the electrostatic force generated between the stator electrodes, (i.e., the first and second stator electrodes 22A, 22B) and the first slider electrode 30A such that the first slider electrode 30A is moved toward the first and second stator electrodes 22A, 22B. In the next step, the switching circuit 40 is operated to change the voltage-applying electrode from the first and second stator electrodes 22A, 22B to the extended electrode 26D so as to apply a voltage to the extended electrode 26D, with the result that the slider 3 is moved away from the third stator electrode 22C so as to be attracted toward the second stator 2B, as shown in FIG. 9D.

Then, the voltage-applying electrode is switched from the extended electrode 26D to the second and third stator electrodes 22B, 22C in accordance with the operation of the switching circuit 40 so as to permit a voltage to be applied to the second and third stator electrodes 22B, 22C as shown in FIGS. 9B and 9C, with the result that the slider 3 is attracted toward the second stator 2A by the electrostatic force generated between the stator electrodes (i.e., the second and third stator electrode 22B, 22C) and the fist slider electrode 30A. Then, the voltage-applying electrode is switched from the second and third stator electrodes 22B, 22C to the extended electrode 26D by the operation of the switching circuit 40 so as to permit a voltage to be applied to the extended electrode 26d as shown in FIG. 9D, with the result that the slider 3 is moved away from the first and second stator electrodes 22A, 22B so as to be attracted toward the second stator 2B.

Then, the voltage-applying electrode is switched from the extended electrode 26D to the third and fourth stator electrodes 22C, 22D in accordance with the operation of the switching circuit 40 so as to permit a voltage to be applied to the third and fourth stator electrodes 22C, 22D as shown in FIGS. 9C and 9D, with the result that the slider 3 is attracted toward the first stator 2A by the electrostatic force generated between the stator electrodes (i.e., the third and fourth stator electrodes 22C, 22D) and the first slider electrodes 30A as shown in FIG. 8. In the nest step, the voltage-applying electrode is switched from the third and fourth stator electrodes 22C, 22D to the extended electrode 26D in accordance with the operation of the switching circuit 40 so as to permit a voltage to be applied to the extended electrode 26D, with the result that the slider 3 is moved away from the second stator electrode 22B so as to be attracted toward the second stator 2B as shown in FIG. 9D.

Further, the voltage-applying electrode is switched from the extended electrode 26D to the fourth and first stator electrodes 22D, 22A in accordance with the operation of the switching circuit 40 so as to permit a voltage to be applied to the fourth and first stator electrodes 22D, 22A, with the result that the slider 3 is attracted toward the first stator 2A by the electrostatic force generated between the stator electrodes (i.e., the fourth and first stator electrodes 22D, 22A) and the first slider electrode 30A. In the next step, the voltage-applying electrode is switched from the fourth and first stator electrodes 22D, 22A to the extended electrode 26D in accordance with the operation of the switching circuit 40 so as to permit a voltage to be applied to the extended electrode 26D as shown in FIG. 9D, with the result that the slider 3 is moved away from the fourth and first stator electrodes 22D, 22A so as to be attracted toward the second stator 2B.

In the electrostatic actuator shown in FIG. 7, it is possible to permit a voltage to be applied to the first stator electrode 22A, the extended electrode 26d, both the first and second stator electrodes 22A and 22B, the extended electrode 26D, the second stator electrode 22B, the extended electrode 26D, both the second and third stator electrodes 22B and 22C, the extended electrode 26D, the third electrode 22C, the extended electrode 26D, both the third and fourth stator electrodes 22C and 22D, the extended electrode 26D, the fourth stator electrode 22D, the extended electrode 26D, both the fourth and first stator electrodes 22D, 22A, the extended electrode 26, and the first stator electrode 22A in the order mentioned. As a result, the slider 3 is linearly moved slightly in the arranging direction 24 of the electrodes mounted to the first stator 30A on the macroscopic level while the slider 3 is being vibrated in the vertical direction on the microscopic level.

The driving force for operating the electrostatic actuator will now be described briefly with reference to FIG. 8. The following description covers the case where the four stator electrodes 22A, 22B, 22C and 22D are mounted. However, the present invention is not limited to the case where the four stator electrodes are mounted to the first stator. In other words, a similar driving force is imparted to the slider 3 in the case where the driving force is imparted from the stator, to which three stator electrodes or an n-number of stator electrodes are mounted, to the slider 3.

The driving force, i.e., the generated force having a vertical component Fz and a horizontal component Fy, is represented by formulas (1) and (2) given below on the assumption that each of the slider 3 and the stator electrodes 22A, 22B, 22C, 22D mounted to the stator 2 are parallel plate conductor electrodes that do not have a thickness:

$$Fz = n \times \in SV^2/2d^2 \quad (1)$$

$$Fy = n \times \in LV^2/2d \quad (2)$$

where n denotes the number of slider electrodes 30A mounted to the slider 30A. The symbol $\in$ denotes the dielectric constant between the slider 3 and each of the stator electrodes 22A, 22B, 22C, 22D mounted to the stator 2A, the dielectric constant being represented by the product between the dielectric constant of vacuum and the dielectric constant between the slider electrode 30A and each of the stator electrodes 22A, 22B, 22C, 22D mounted to the stator 2A. The dielectric constant of vacuum is $\in_0 = 8.85 \times 10^{-12}$ [N/m]. The relative dielectric constant is about 1 for the air and about 3 for polyimide used for, for example, insulation of the electrode. Character S denotes the mutually facing area between the slider electrode 30A and the stator electrodes 22A, 22B, 22C, 22D, which extends in parallel to form parallel plates. The area S is determined by "w×L", where w denotes the width of the electrode sections mutually facing each other as shown in FIG. 8 (i.e., the width along the side extending in the forward direction), and L denotes the length. Character v denotes the voltage applied between the electrodes. Further, d denotes the distance between adjacent electrodes. The distance d corresponds to the gap Ga shown in FIG. 8.

Formulas (1) and (2) given above will now be considered under the state that a voltage is applied between the stator electrodes 22C and 22D so as to be rendered active. Incidentally, the edge in the forward direction of the stator electrode 22C, i.e., the left edge, is defined as the reference position, which is the origin 0, and the forward direction is defined as positive, and the backward direction is defined as negative. Under the state that the left edge of the slider electrode 30A shown in FIG. 8 is positioned leftward of the left edge of the stator electrode 22C, i.e., where the displacement X is larger than −L, the slider electrode 30A and the stator electrode 22C are not positioned to overlap each other, failing to form parallel plates. In this case, the component Fy of the generated force is rendered substantially zero.

On the other hand, when the left edge of the slider 3 is positioned to fall within a range between the negative length L and the origin 0 relative to the left edge of the stator electrode 22C, as shown in FIG. 8, i.e., where the displacement X is within a range of zero to −L, the component Fy of the generated force is rendered constant regardless of the position of the left edge of the slider 3. This is because there is no component in formula (2) in the horizontal direction. Also, when the slider 3 is positioned remote from the origin 0 by a range within the length L in the positive direction relative to the stator electrode 22C, i.e., where the displacement X is within a range of zero to +L, the magnitude of the generated force is rendered constant in the negative direction. This is because the depth direction of the slider 3 neglects the influence on the generated force. Specifically, the influence of the mutual function performed between the tapered portion of the side surface of the slider electrode 30A shown in FIG. 8 and the stator electrodes 22A, 22B, 22C, 22D mounted to the stator 2A is neglected. In the actual actuator, it is necessary to take these influences into consideration. However, these influences are neglected in the description given above for the sake of brevity of the description.

Figure 10:
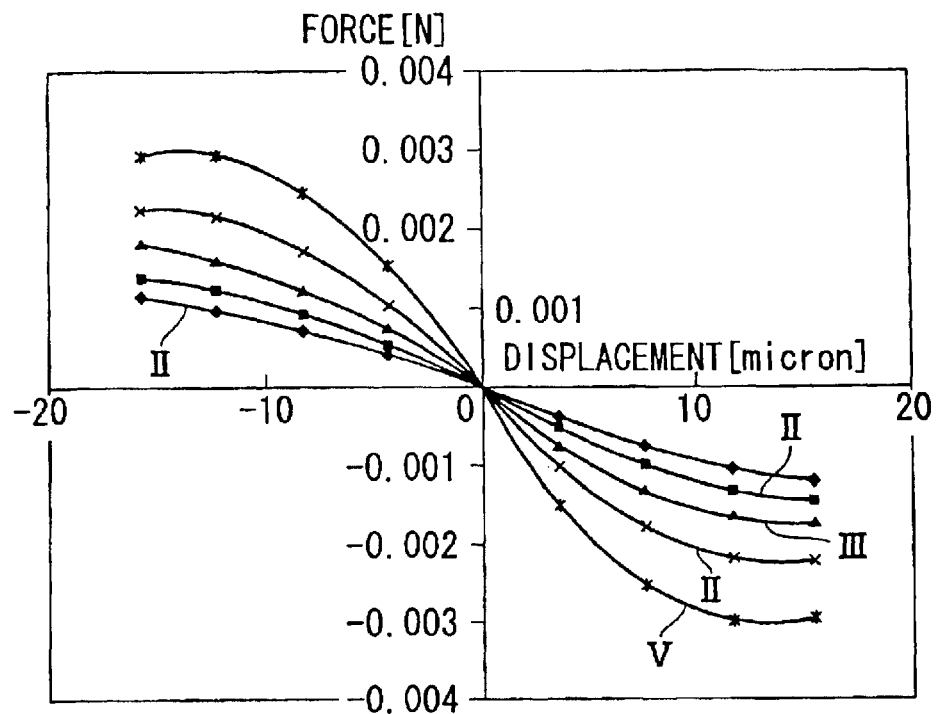
FIG. 10 is a graph showing the relationship between the displacement, with a gap in the electrostatic actuator shown in FIGS. 7 and 8 used as a parameter, and the driving force imparted to the slider.

FIG. 10 shows graphs I, II, III, IV and V relating to the generated force in the horizontal direction based on the situation described above. These graphs show by the finite-element method the changes in the generated force on the basis of the positional relationship between the slider 3 and the stator electrodes 22A, 22B, 22C, 22D mounted to the stator 2A. In the graph of FIG. 10, the generated force Fy in the horizontal direction in unit of Newton (N), in which the forward direction is positive, is plotted on the ordinate. On the other hand, the positional relationship between the slider 3 and the stator electrodes 22A, 22B, 22C, 22D mounted to the stator 2A, i.e., the values of displacement in which the forward direction is positive, is plotted on abscissa. In these graphs I, II, III, IV and V, the gap Ga shown in FIG. 8 is taken as a parameter, in which the gap Ga is 7.8 μm for graph II, 5.8 μm for graph III, 4.8 μm for graph IV, and 3.8 μm for graph V. The size of the electrostatic actuator for obtaining the graph of FIG. 10 is determined on the assumption that the mechanism is used in mobile equipment such as a portable telephone or cellar phone. For example, the gap is set at 3.8 μm to 7.8 μm, L is set at 28 μm, w is set at 12 μm, Ph is set at 16 μm, and the number of slider electrodes 30A mounted to the slider is set at 94.

As apparent from the graphs of FIG. 10, the generated force Fy in the horizontal direction is gradually changed about the time when the slider electrode 30A of the slider 3 is moved to overlap with the stator electrode 22C and about the time when the slider electrode 30A is moved away from the stator electrode 22C. Incidentally, it is possible to substitute a sine wave waveform between the origin 0 and the point of the maximum value for the generated force Fy in the horizontal direction. In FIG. 10, the voltage applied to the stator electrodes is a calculated value at 100V. According to the graphs shown in FIG. 10 and the result of the study based on these graphs, the gap should fall within a range of between 3 μm and 10 μm, preferably between 3 μm and 5 μm. It has been clarified that, if the gap falls within the range noted above, it is possible to impart effectively the generated force Fy in the horizontal direction to the slider 3.

Another modified embodiment of the electrostatic actuator of the present invention will now be described with reference to FIG. 11. Those members of the actuator shown in FIG. 11 which are same as those shown in FIG. 3 are denoted by the same reference numerals so as to avoid the overlapping description.

Figure 11:
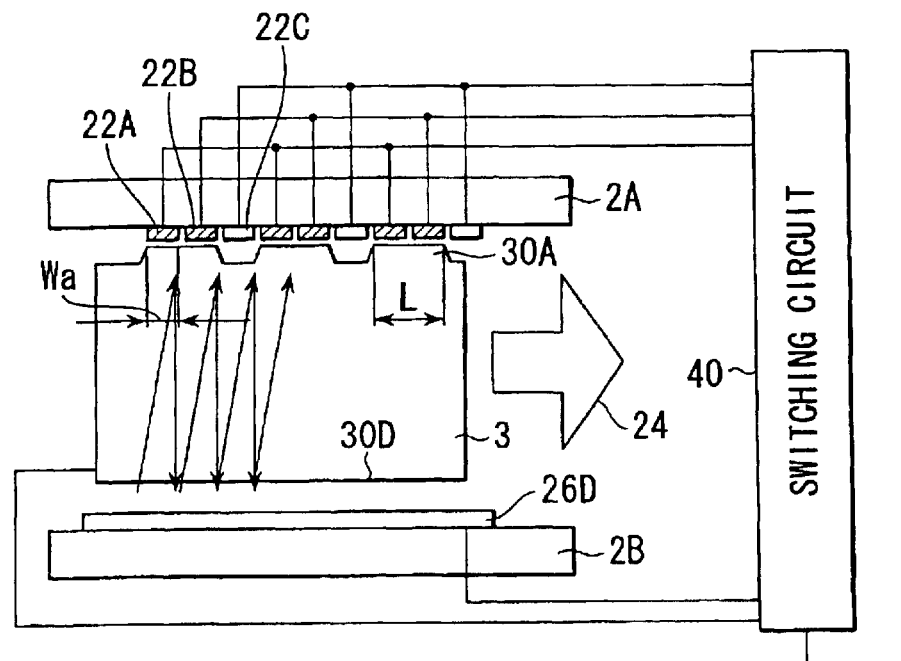
FIG. 11 is a cross sectional view schematically showing the construction of an electrostatic actuator according to another modified embodiment of the present invention.

FIG. 11 schematically shows the construction of an electrostatic actuator according to a modified embodiment of the present invention. In the electrostatic actuator shown in FIG. 11, the electrode width L of the slider electrode 30A of the slider 3 is set to fall within a range of between 1.5 times and 2.5 times as much as the width Wa of each of the first stator electrode 22A, the second stator electrode 22B and the third stator electrode 22C mounted to the stator 2A. It follows that, within the range of the sliding movement of the slider 3, the slider electrode 30A is kept facing two of the first stator electrode 22A, the second stator electrode 22B and the third stator electrode 22C.

In the electrostatic actuator shown in FIG. 11, a signal voltage, which can be easily estimated based on the timing charts shown in FIGS. 9A and 9F, is applied to the first to third stator electrodes 22A, 22B, 22C, the slider electrodes 30A, 30D and the extended electrode 26D. Therefore, the drawing relating to the signal voltage is omitted, and the operation of the mechanism will now be described as follows.

In the first step, if a voltage is applied to the first and second stator electrodes 22A, 22B, the slider 3 is attracted toward the stator 2A, with the result that an acting force permitting the first and second stator electrodes 22A, 22B to overlap with the first slider electrode 30A of the slider 3 is generated between the stator electrodes 22A, 22B and the first slider electrode 30A. Then, if the voltage is applied to the extended electrode 26D, the slider 3 is attracted toward the stator 2B. Further, if voltage is applied to the second and third stator electrodes 22B, 22C, the slider 3 is attracted toward the stator 2A as in the case where the voltage is applied to the first stator electrode 22A and the second stator electrode 22B, with the result that the slider electrode 30A of the slider 3 receives the acting force so as to overlap with the stator electrodes 22B, 22C. In other words, the voltage is repeatedly applied to both the first and second stator electrodes 22A, 22B, the extended electrode 26D, both the second and third stator electrodes 22B, 22C, the extended electrode 26D, both the third and first stator electrodes 22C, 22A, the extended electrode 26D and, then, to both the first and second stator electrodes 22A, 22B in the order mentioned. As a result, the slider 3 is linearly moved slightly in the arranging direction of the stator electrodes mounted to the first stator 2A, i.e., in the forward direction 24, on the macroscopic level, while the slider 3 is being vibrate in a direction crossing the forward direction, on the microscopic level. It should also be noted that, if the voltage is repeatedly applied in the order opposite to the order noted above, i.e., if the voltage is applied first to both the stator electrodes 22A, 22B, and, then, to the extended electrode 26D, both the second and third stator electrodes 22B, 22C, the extended electrode 26D, both the stator electrodes 22C, 22B, the extended electrode 26D, and then to both the stator electrodes 22A, 22B in the order mentioned, the slider 3 is moved slightly in the backward direction.

Figure 12A:
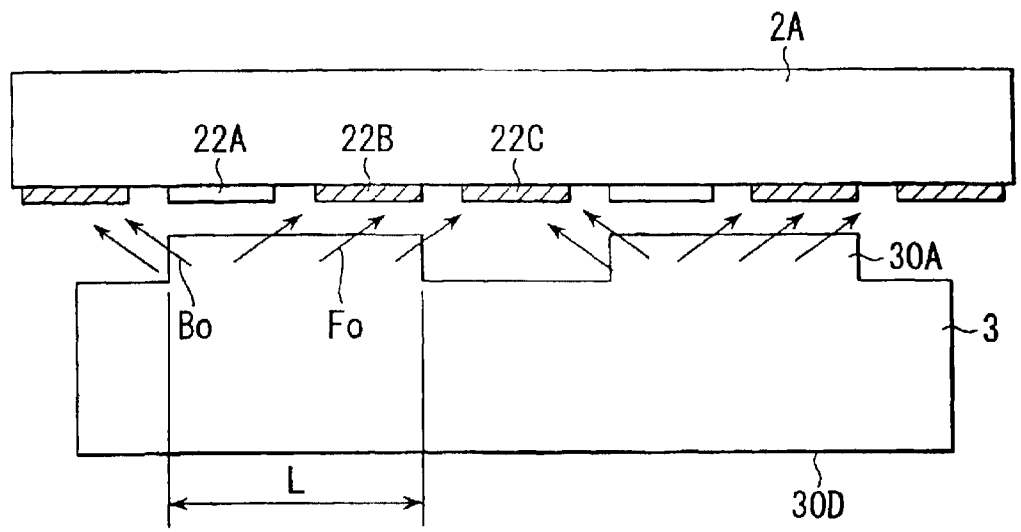
FIGS. 12A and 12B are views relating to the electrode width of the slider of the electrostatic actuator shown in FIG. 11 and also relating to the operation of the slider.
Figure 12B:
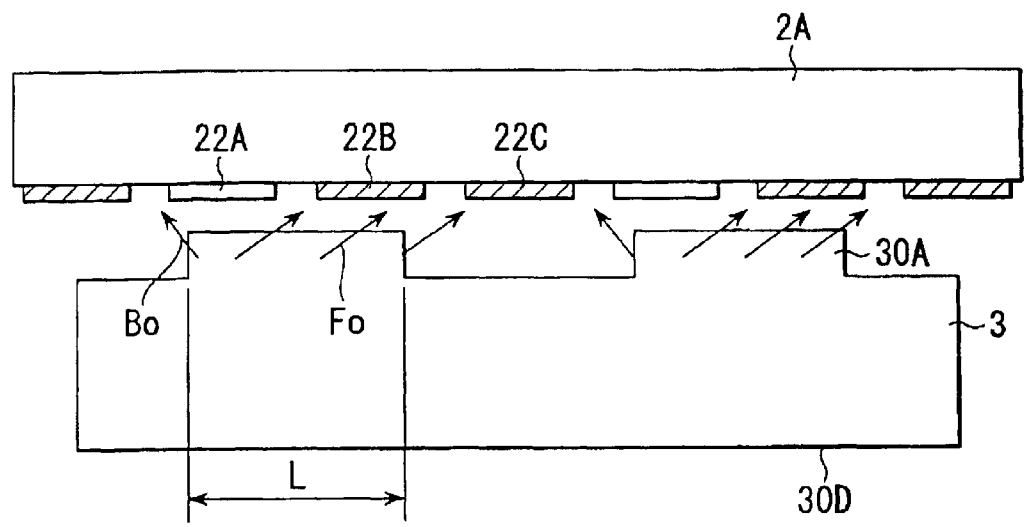

In the modified embodiment shown in FIG. 11, the electrode width L of the slider electrode 30A mounted to the slider 3 is set to fall within a range of between 1.5 times and 2.5 times as much as the electrode width Wa of each of the stator electrodes mounted to the stator 2A as described above. It should be noted in this connection that, if voltage is applied to both the stator electrodes 22B and 22C as shown in FIG. 12A, an acting force BO having a component in the backward direction, which inhibits the forward movement, is also generated in addition to the acting force FO having a component for moving the slider 3 in the forward direction 24. It follows that, in order to diminish the acting force BO in the opposite direction as much as possible, it is desirable for the electrode width L of the slider 3 to be small as shown in FIG. 12B. However, if the electrode width L is small to make the total area of the electrodes 30 excessively small, the acting force for vibrating the slider 3 between the stators 2A and 3B is lowered. Also, the positioning force for positioning the slider electrode 30A mounted to the slider 3 in substantially the center between the adjacent stator electrodes to which voltage is applied tends to be rendered unstable. It follows that, as a result of the study of the electrode width L of the slider 30 by the electromagnetic field analysis in view of the overall comprehension of these situations, it has been found desirable to set the electrode width L of the slider electrode 30A of the slider 3 to fall within a range of between 1.5 times and 2.5 times as much as the electrode width Wa of each of the stator electrodes mounted to the stator 2B.

An electrostatic actuator according to another modified embodiment of the present invention will now be described with reference to FIGS. 13A, 13B, 14A and 14B.

Figure 13A:
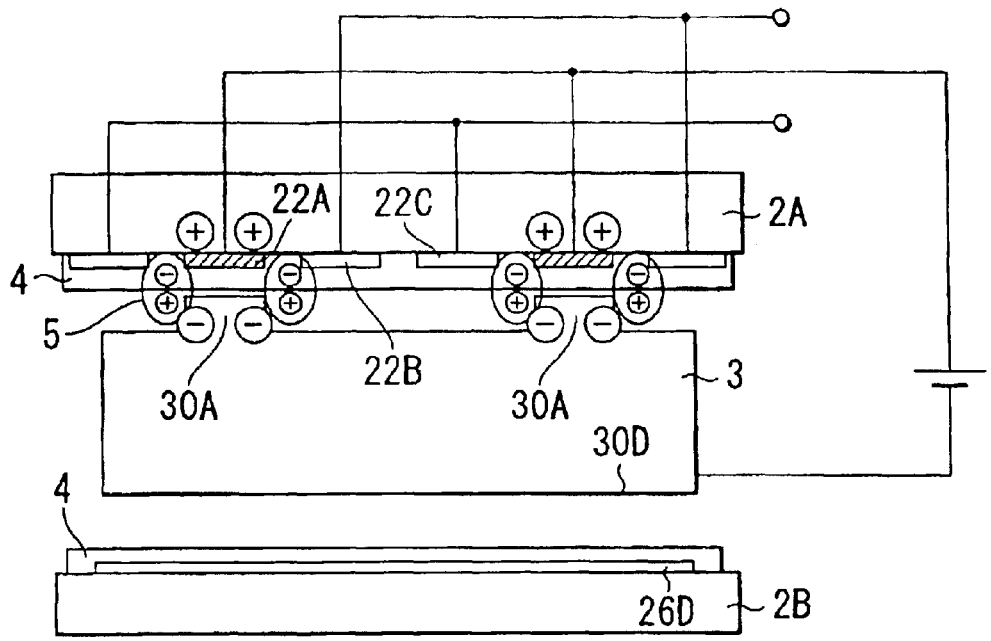
FIGS. 13A and 13B are cross sectional views schematically showing another modified embodiment of the electrostatic actuator shown in FIG. 3.
Figure 13B:
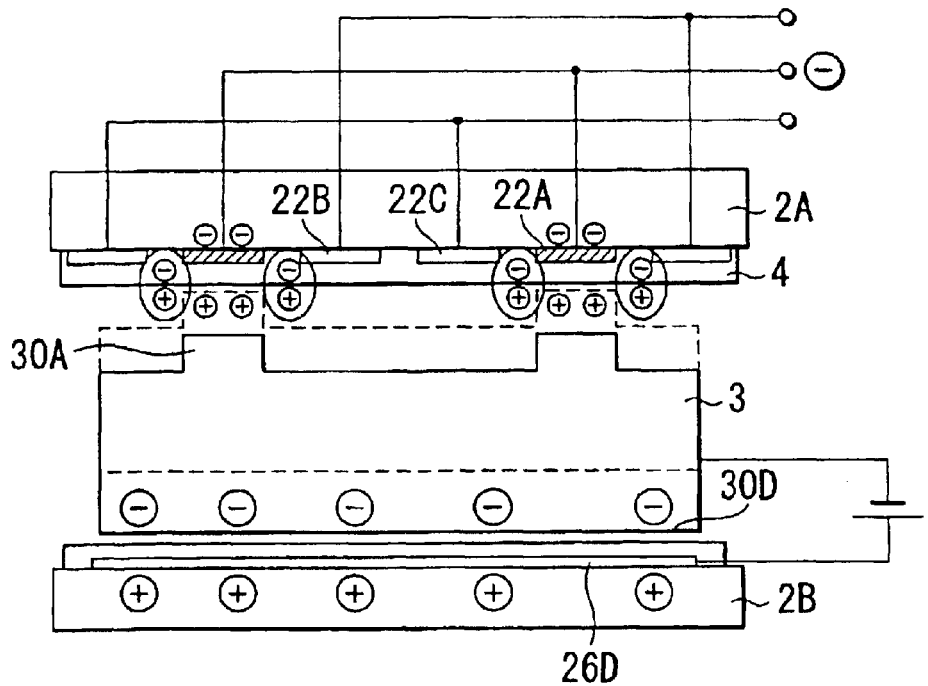

If voltage is applied to the stator electrode 22A of the stator 2A in the construction shown in FIGS. 13A, 13B, the slider 3 receives an electrostatic force (Coulomb force) so as to be attracted toward the stator 2A because of the electric field generated between the slider electrode 30A of the slider 3 and the stator electrode 22A of the stator 2A. In this case, if the stator electrode 22A is brought into direct contact with the slider electrode 30A of the slider 3, an electric short circuit takes place so as to instantly destroy the electrode. Such being the situation, it is desirable to arrange the dielectric film 4 having sufficient insulation breakdown strength between the stator electrode 22A and the slider electrode 30A.

In the method of applying the voltage described above, a dielectric polarization 5 takes place in the dielectric film 4 arranged in the vicinity of the stator electrode 22A on the side of the stator 2A, with the result that the surface of the stator 2 is caused to bear a positive potential relative to the slider electrode 30A. It follows that, even if the control is transferred to the next driving sequence, it is possible for the phenomenon that the slider is not driven toward the stator 2B having the extended electrode 26B to take place. The particular phenomenon is the to be caused because an electrical inclination is brought about within the dielectric film 4 by the dielectric polarization. The residual potential caused by the dielectric polarization is small. However, since the Coulomb force is inversely proportion to the square of the distance between the electrodes, a large acting force is imparted to the slider 3 even if the residual potential is small under that state that the slider electrode 30A is once attracted by the stator electrode 22A and, thus, the distance between these two electrodes is small.

According to the modified embodiment shown in FIGS. 13A, 13B, 14A and 14B, it is possible to realize a driving sequence that permits suppressing the adverse effect of the dielectric polarization as much as possible and to drive the slider 3 satisfactorily.

In the modified embodiment shown in FIGS. 13A and 13B, a potential difference is imparted between the stator electrode 22A of the stator 2A and the slider electrode 30A of the slider 3 such that the potential of the stator electrode 22A is lower than that of the slider electrode 30A when the state that the slider 3 is attracted toward the stator electrode 22A is changed into the next driving sequence in which voltage is applied to the extended electrode 26D. For example, if the potential level of the slider 3 is set at zero, a potential difference is imparted between the stator electrode 22A and the slider electrode 30A such that the stator electrode 22A assumes a negative potential. If such a potential difference is imparted, the slider 3 is readily moved away from the stator 2A so as to realize a smooth actuator function. If viewed macroscopically, the electric field formed between the stator electrode 22A of the stator 2A and the corresponding slider electrode 30A of the slider 3 because of the inclination of the remaining charges caused by the dielectric polarization within the dielectric film 4 is opposite in direction to the electric field generated between the potential newly applied to the stator electrode 22A, which is lower than the potential level of the slider electrode 30A, and the slider electrode 30A, with the result that these two electric fields nullify each other. If viewed microscopically, the phenomenon described above can be explained to the effect that the inclination of the residual charge within the dielectric film 4 caused by the dielectric polarization 5 is eliminated by the electric field formed by the potential newly applied to the stator electrode 22A, the potential being lower than the potential level of the slider electrode 30A.

For operating the actuator shown in FIGS. 13A and 13B, the voltage signals as shown in FIGS. 14A to 14E are applied to the electrodes through the switching circuit 40. FIGS. 14A, 14B, and 14C show the timing charts of signal voltages applied to the stator electrodes 22A, 22B and 22C, respectively. FIG. 14D shows the timing chart of the signal voltage applied to the stator electrode 26D. Further, FIG. 14E shows the voltage applied to the slider electrodes 30A, 30D. The voltage shown in FIG. 14E, which is applied to the slider electrodes 30A, 30D is a ground potential. The low level of the signal voltage applied to the stator electrode 26D, which is shown in FIG. 14D, is has a low level of the ground potential and a high level of a high potential. Also, the high level of each of the signal voltages applied to the stator electrodes 22A, 22B, 22C, which are shown in FIGS. 14A, 14B and 14C, respectively, represents a high potential, and the low level is set at a negative potential, with the intermediate level providing the ground potential. It follows that the slider electrode 3A is attracted to the stator electrodes 22A, 22B and 22C by the attracting force when the voltage signals shown in FIGS. 14A, 14B, 14C have a high level, and the slider electrode 3A is separated from the stator electrode 22A, 22B, 22C by the repulsive force when the when the voltage signals shown in FIGS. 14A, 14B, 14C have a low level. Further, the slider electrode 30A does not receive any acting force from the stator electrodes 22A, 22B, and 22C when the voltage signals shown in FIGS. 14A, 14B, and 14C have an intermediate level.

Figure 15A:
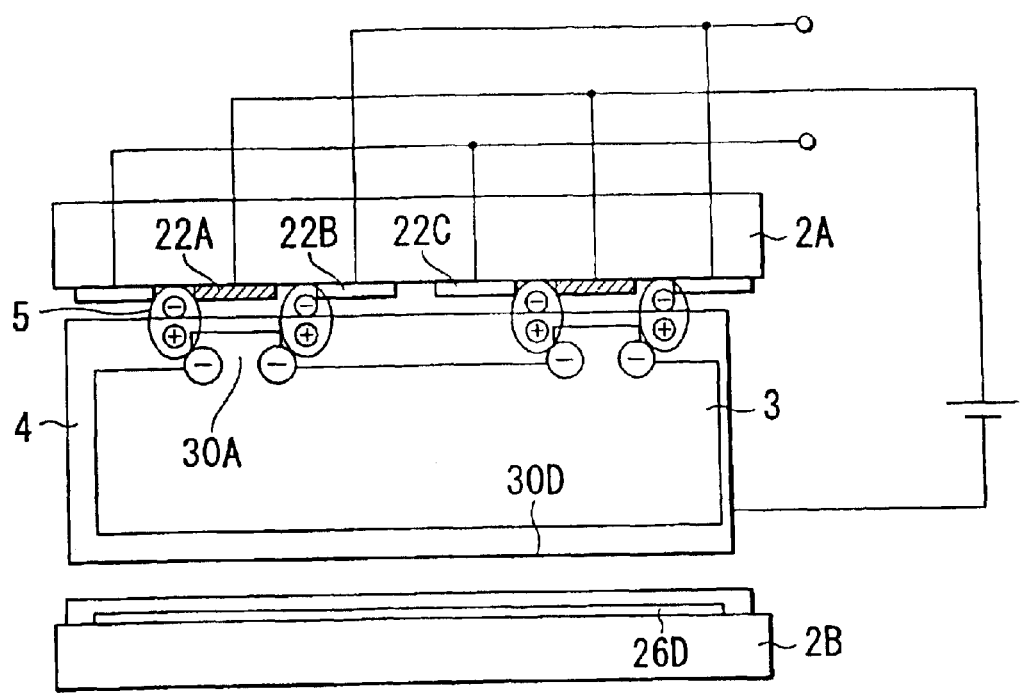
FIGS. 15A and 15B are cross sectional views schematically showing another modified embodiment of the electrostatic actuator shown in FIG. 3.
Figure 15B:
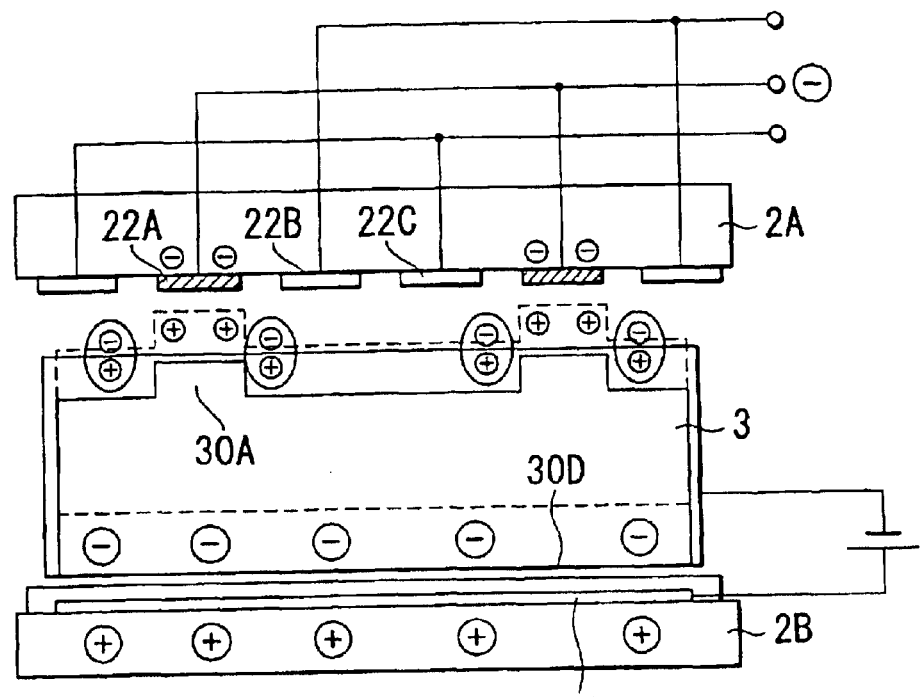

Incidentally, it is possible for the potential of the slider electrode 30A to be in a floating state that the slider electrode 30 is not electrically connected to the ground. It is also possible to arrange a dummy electrode connected to the ground in the vicinity of the slider 3 so as to permit an electrostatic attractive force to the slider electrode 30A to exert effectively. Also, in the example shown in FIGS. 13A and 13B, a dielectric film is arranged on the side of the stator 2A. Alternatively, it is possible to arrange the dielectric film 4 on the side of the slider 3 as shown in FIGS. 15A, 15B. The actuator shown in FIGS. 15A and 15B is operated similarly by the application of voltage signals as shown in FIGS. 14A to 14E from the switching circuit 40 to each of the electrodes.

The specific construction and the manufacturing method of an electrostatic actuator according to another embodiment of the present invention will now be described with reference to FIGS. 16 and 17A to 17C.

In the electrostatic actuator shown in FIG. 16, the slider 3 is formed in the form of a hollow cube. Slider electrodes 30A are arranged at a predetermined pitch on one outer plane 6 of the slider 3. The plane 6 is positioned to face the stator electrodes 22A to 22C. Also, a lens 7 of another optical element is formed in one open portion of the slider 3. By the driving of the electrostatic actuator, the plane of the lens 7 is moved forward or backward. In FIG. 16, the lens 7 is fixed to one open portion of the slider 3. Alternatively, it is also possible to mount the lens 7 on the other open portion opposite to the open portion shown in the drawing. The slider 3 provided with the lens 7 and the slider electrodes 30A constituting the electrostatic actuator can be manufactured by, for example, a glass molding technology. To be more specific, it is possible for the lens 7 to be formed integral with the slider 3 such that a part of the slider 3 has a lens function.

The manufacturing method of the slider 3 of the electrostatic actuator shown in FIG. 16 will now be described with reference to FIGS. 17A to 17C.

Figure 17A:
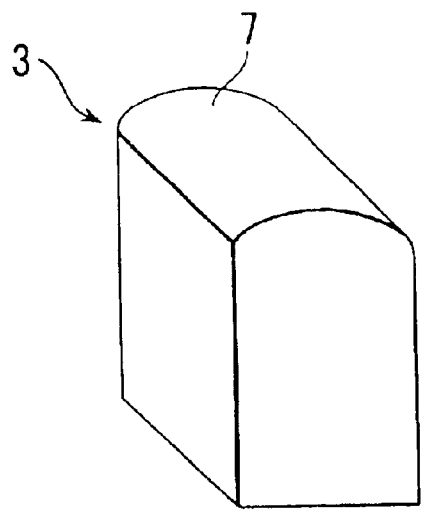
FIGS. 17A to 17C are perspective views schematically showing collectively the manufacturing process of a slider according to another modified embodiment of the electrostatic actuator shown in FIG. 3.
Figure 17B:
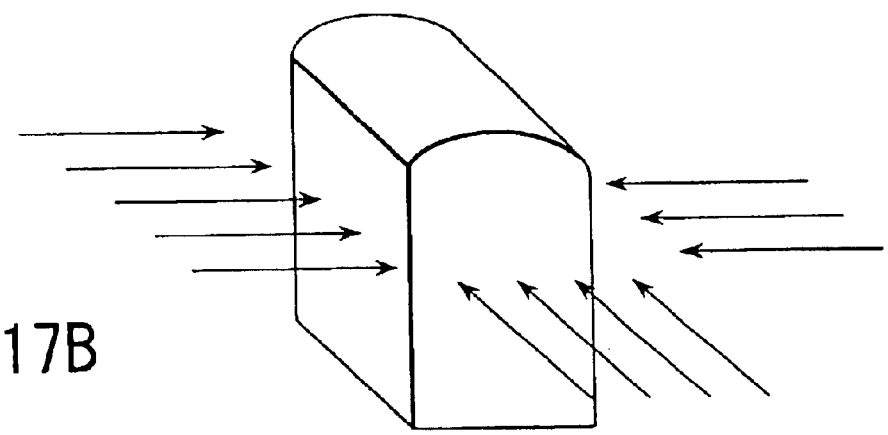
Figure 17C:
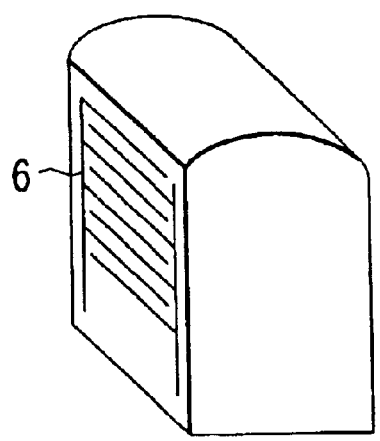

In the first step, prepared is a block formed by the glass molding technology, which is a hollow cube having the lens 7 formed on one plane, i.e., the upper plane, as shown in FIG. 17A. Then, the slider 3 is mounted with the lens 7 facing upward, as shown in FIG. 17A, and the lower plane facing the upper plane is in contact with a jig such a metal plate so as to permit the slider 3 to be fixed to the jig. Then, the side surface of the slider 3 is covered with a conductive material. It is possible to employ any of a sputtering method, a vapor deposition method and a coating method as the covering method. By this covering, the five planes of the hollow cube are covered with the conductor film except the lower plane that is in contact with, for example, a jig. Further, the conductor film is coated with a resist by, for example, a resist coating method, i.e., a so-called "spray system", utilizing an electrostatic attracting force. As a result, the five planes of the hollow cube are covered with the resist film except the lower plane that is in contact with, for example, the jig.

In the next step, the slider 3 is detached from the jig or the like and is mounted to a jig (not shown) for patterning the electrodes on the slider 3. The jig for the electrode patterning has a housing section for housing the slider 3, and the slider 3 is housed in the housing section of the jig such that one side surface of the slider 3 that is to be patterned is exposed to the outside. The slider 3 housed in the housing section is fixed to the jig for the electrode patterning without fail by the mechanical pressing such as a spring or the like housed in the housing section or by a suction mechanism provided with a negative pressure.

Incidentally, it is possible for the jig for the electrode patterning to have a structure that permits mounting a plurality of sliders 3, e.g., a structure having a plurality of housing sections.

Then, a patterning transfer utilizing a photographic transfer system (i.e., a so-called "photo-fabrication technology) is applied to the exposed side surface so as to sensitize the resist. In the next step, the resist portion is etched so as to form a resist pattern of a predetermined pattern, thereby etching the conductive film, i.e., and the metal portion, of the pattern thus formed, with the result that the conductive pattern alone of a predetermined pattern is left unremoved.

Incidentally, it is possible for the conductive material of the conductive film to consist of a transparent material such as ITO or an opaque material. Where a transparent material is used as the conductive material of the conductive film, the surface of the lens 7 is covered simply with the transparent layer and, thus, the transparent layer need not be particularly removed. It follows that the manufacture of the slider 3 is finished by the etching step.

Where an opaque material is used as the conductive material of the conductive film, the slider 3 is detached from the jig for the electrode patterning before the etching step, and the slider 3 is mounted again to the jig for the electrode patterning with the plane of the lens 7 facing upward. Then, a pattern transfer utilizing a photographic transfer system (which is a so-called "photo-fabrication technology") is applied by using an optical mask (which is generally reticule in the semiconductor process) so as to expose the resist film covering the film of the conductive material formed on the plane of the lens 7. Then, the resist portion is removed by etching, followed by removing the metal portion by etching, thereby finishing preparation of the slider 3. In this embodiment, the resist film is positive type, which is melted after the resist film is exposed with light. However, the resist film may be negative type, in which unexposed portion or portions are melted after the resist film is exposed with light.

Incidentally, the slider electrode 30A of the slider 3 is electrically connected to all the four side surfaces including the portion patterned in a ladder shape. In place of forming the ladder-shaped slider electrode 30A, it is possible to provide an irregular shape in which projections and recesses are repeated at a pitch P on the surface and to cover the entire surface with a film of a conductive material.

It is also possible to arrange a region 8, in which the ladder-shaped electrodes are not positioned, in a part of the plane 6 in which the ladder-shaped electrodes 30A are formed as shown in FIG. 16, in order to prevent the slider 3 from being brought into direct contact with the stator electrodes 22A, 22B, 22C mounted to the stator and with the extended electrode 26D. In this case, it is desirable to permit a stopper 10 mounted to the slider 3 to abut against the region 8 as shown in FIGS. 18A and 18B. To be more specific, the stopper 10 having a thickness larger than the thickness, i.e., the height, of the stator electrodes 22A, 22B, 22C is arranged on the surface regions of the stators 2A, 2B facing the regions 8, as shown in FIGS. 18A and 18B. The stopper 10 is allowed to abut against the region 8 by the vibration of the slider 3 and to slide along the region 8. As a result, it is possible to prevent the slider electrodes 30A, 30B of the slider 3 from being brought into contact with the stator electrodes 22A, 22B, and 22C of the stator 2A and with the extended electrode 26D of the stator 2B. It should be noted that it is also possible for the stopper 10 to be mounted on the side of the slider 3 such that the stopper 10 is brought into contact with the region in which the electrodes of the stators 2A and 2B are not mounted, as shown in FIGS. 19A and 19B.

As described above, the slider can be manufactured easily by the manufacturing method described above, making it possible to realize an electrostatic actuator rich in mass production capability and capable of being manufactured with a low cost.

Another construction of an electrostatic actuator of the present invention and the manufacturing method thereof will now be described with reference to FIG. 20. In the electrostatic actuator shown in FIG. 20, a box-like member 52D open on both sides facing each other is prepared as a stator 2B. Also, a lid-like member 52C closing the upper opening of the box-shaped member 52D is prepared as a stator 2A. It should be noted that the stator electrodes 22A, 22B, 22C of the stator 2A are formed on the inner surface of the box-shaped member 52D, and the extended electrode 26D of the stator 2B is formed on the inner surface of the lid-like member 52C. These two members 52C, 52D are combined as shown in FIG. 20 and bonded to each other so as to prepare a stator structure 2 provided with electrodes arranged a predetermined distance apart from each other and imparting a predetermined clearance between the stator structure 2 and the slider 3. Before assembly of the stator structure 2, the slider 3 is arranged in advance within the box-shaped member 52D, followed by bonding these two members 52C and 52D to each other so as to finish preparation of the electrostatic actuator.

The stator 2 having a high accuracy can be prepared by a molding method. Specifically, the stator structure 2 having a void portion having a longitudinal axis in the driving direction of the slider can be easily prepared by manufacturing parts of the stator structure 2 by processing a plate material by punching or a pressing as a mold formation. It is also possible to manufacture the stator structure 2 having the electrodes arranged at a predetermined distance apart from each other with a high accuracy. Incidentally, in the structure shown in FIG. 20, the uniform extended electrode 26D is formed on the inner surface of the stator structure 52C. However, it is also possible to form the extended electrode 26D on the stator structure 52D, with the stator electrodes 22A, 22B, 22C being formed on the stator structure 52C.

Several constructions relating to the stator included in the electrostatic actuator of the present invention and the manufacturing method thereof will now be described with reference to FIGS. 21A, 21B, 21C, 22A, 22B, 22C, 22D, 23A, 23B and 23C.

FIG. 21A is a plan view showing the stator of the electrostatic actuator. FIGS. 21B and 21C are cross sectional views along the line B—B shown in FIG. 21A and along the line A—A shown in FIG. 21A, respectively. As shown in FIG. 21A, a substrate 11 used as the stator 2A has a surface facing the slider 3, and the first to third stator electrodes 22A, 22B, 22C are formed on the surface facing the slider 3. As shown in FIG. 21C, a glass substrate or a silicon substrate having an insulating film such as a silicon oxide film formed thereon is used as the substrate 11. FIG. 21A shows three sets of the first to third stator electrodes 22A to 22C. The first stator electrode 22A and the third stator electrode 22C are arranged to form a comb-shaped configuration together with the wirings connected to these stator electrodes. The second stator electrode 22B is arranged between the first stator electrode 22A and the third stator electrode 22C, and the wiring extending from the second stator electrode 22B is arranged on the insulating film formed on the wiring extending from the first stator electrode 22A, as shown in FIG. 21B. Further, the wiring extending from the second stator electrode 22B extends via the insulating layer so as to reach the region of an edge portion of the substrate 11 outside the first stator electrode 22A. The wiring is connected to a terminal formed on the surface on which each stator electrode is formed and in the region in the side portion of the surface.

The stator 3 shown in FIG. 21A is manufactured through the process shown in FIGS. 22A to 22D.

Figure 22A:
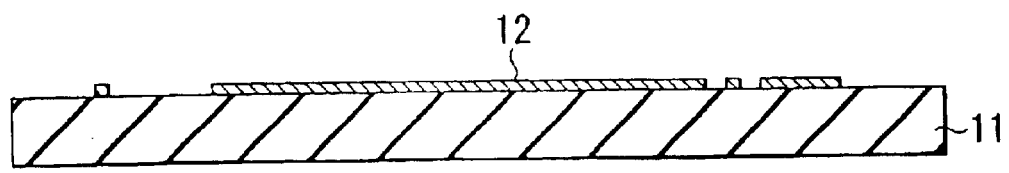
FIGS. 22A to 22D are cross sectional views collectively showing schematically the manufacturing process of the stator of an electrostatic actuator according to another embodiment of the present invention.
Figure 22B:
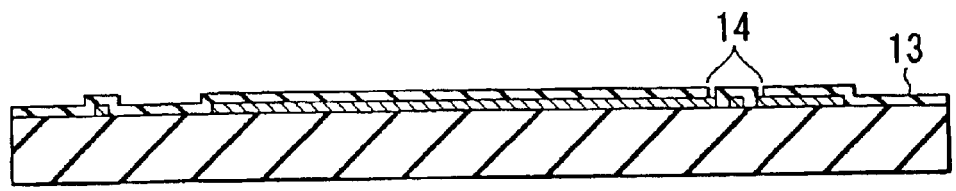
Figure 22C:
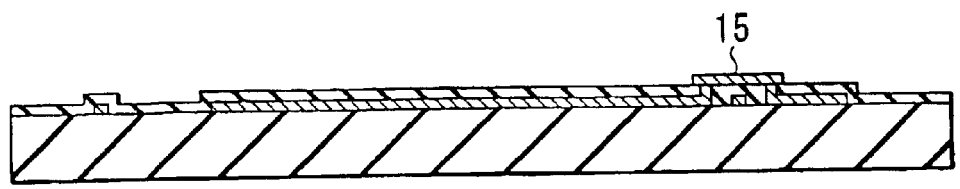
Figure 22D:
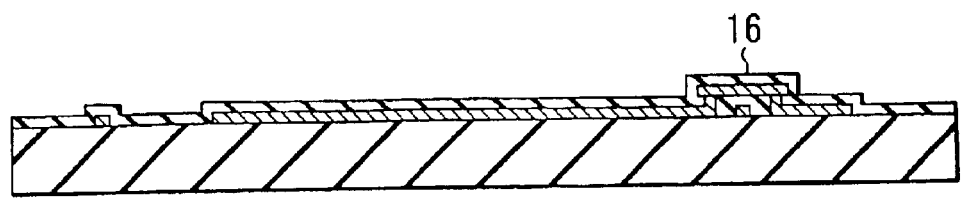

In the first step, prepared is the substrate 11 as shown in FIG. 22A. Formed on the substrate 11 are the stator electrode 22A, the wiring portion for the stator electrode 22A, the stator electrode 22C, the wiring portion for the stator electrode 22C, the stator electrode 22B, and the wiring for the stator electrode 22B arranged outside the wiring portion for the stator electrode 22A. These stator electrodes and the wirings are formed of a metallic material 12 such as an aluminum film. Then, an insulating film 13 is formed on the substrate 11 as shown in FIG. 22B. Also, through-holes 14 for connecting the wiring portion of the stator electrode 22B formed outside the wiring portion of the stator electrode 22A to the stator electrode 22B are formed in the wiring portion of the stator electrode 22B arranged outside the wiring portion of the stator electrode 22A and in a predetermined position of the stator electrode 22B. For forming the insulating film, it is possible to use silicon oxide, silicon nitride or polyamide depending on the manufacturing process. Then, formed is a wiring 15 for connecting the wiring portion of the stator electrode 22B positioned outside the wiring portion of the stator electrode 22A to the stator electrode 22B, as shown in FIG. 21C. Further, an insulating film 16 is formed as required on the wiring 15 serving to connect the wiring portion of the stator electrode 22B positioned outside the wiring portion of the stator electrode 22A to the stator electrode 22B.

It should be noted that the wiring for connecting the wiring portion of the stator electrode 22B to the stator electrode 22B is formed on the upper side of the wiring for the stator electrode 22A with the insulating film interposed therebetween. By contraries, it is also possible to form the wiring serving to connect the wiring portion for the stator electrode 22B to the stator electrode 22B below the wiring for the stator electrode 22A with an insulating layer interposed therebetween. Incidentally, the wiring portion for the stator electrode 22B is formed on the insulating film in the construction described above. Alternatively, it is also possible for the wiring portion to be connected by a wire bonding in place of the use of the wiring portion formed on the insulating film so as to permit the wiring portion for the stator electrode 22A to be electrically connected to the wiring portion for the stator electrode 22B.

In the embodiment described above, the first to third stator electrodes are formed on the substrate 11 constituting the stator. However, the present invention is not limited to the particular construction. For example, it is possible to form a plurality of sets of the first to fourth stator electrodes 22A to 22D on the substrate 11, as shown in FIGS. 23A to 23C.

Still additional construction of the stator incorporated in the electrostatic actuator of the present invention will now be described with reference to FIGS. 24A to 24C.

FIG. 24A is a plan view showing the construction of the stator 2, and FIGS. 24B and 24C are cross sectional views along the lines B—B and A—A, respectively, shown in FIG. 24A. As shown in FIGS. 24A to 24C, the wirings connected to the stator electrodes 22A to 22C are electrically insulated from each other and extend to regions in the side portions of the substrate 11. The end portions of these wirings extend into through-holes extending to reach the back surface of the substrate 11 so as to be connected to the terminals formed on the back surface of the substrate 11. In the substrate 11 of the particular construction, it is possible to apply voltage from the terminals on the back surface of the substrate to the stator electrodes 22A to 22C, making it possible to increase the degree of freedom in the arrangement of the circuit.

Figure 25A:
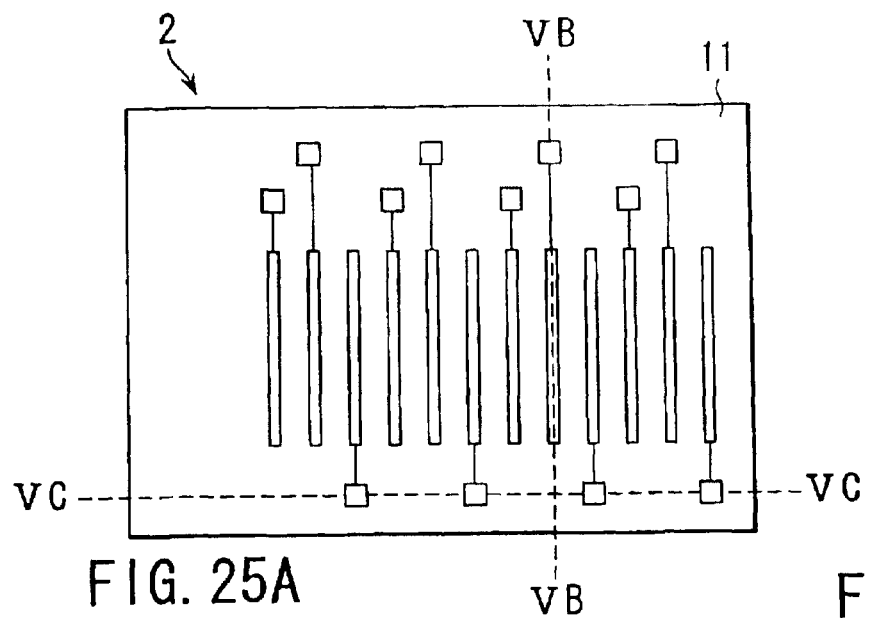
FIGS. 25A to 25D are a plan view, two cross sectional views, and a back view collectively showing schematically the construction of the stator of an electrostatic actuator according to another embodiment of the present invention.
Figure 25B:
Figure 25C:
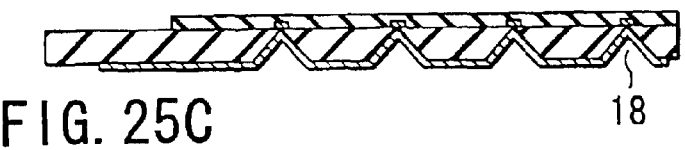
Figure 25D:
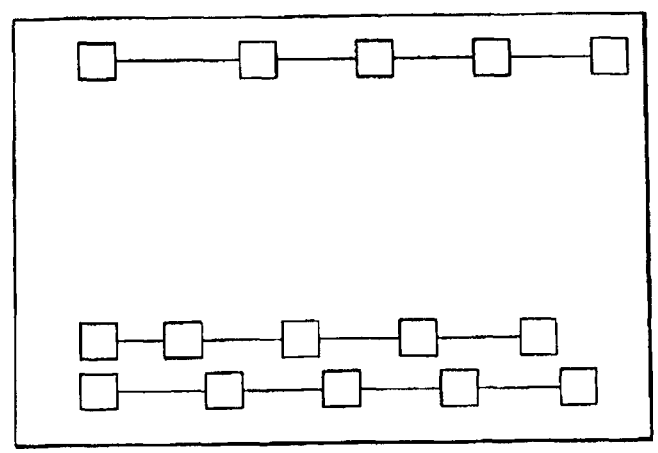

The constructions relating to the stators of the electrostatic actuator of the present invention will now be described with reference to FIGS. 25A to 25D. FIG. 25A is a plan view showing the construction of the stator, FIGS. 25B and 25C are cross sectional views along the lines B—B and A—A, respectively, shown in FIG. 25A, and FIG. 25D is a back view of the substrate 11.

In the construction of the stator shown in FIGS. 25A to 25D, the stator electrodes 22A to 22C are arranged in parallel on the substrate 11. The wirings connected to the stator electrodes 22A to 22C extend linearly, and the terminals at the ends of the extended portions of the wirings are connected to the terminals arranged on the back surface of the substrate 11. In the substrate 11 of the particular construction, it is possible to apply voltage from the terminals arranged on the back surface of the substrate to the stator electrodes 22A to 22C, making it possible to increase the degree of freedom in the arrangement of the circuit.

Further, the construction relating to the stators included in the electrostatic actuator of the present invention will now be described with reference to FIGS. 26A to 26D, 27D, and 28A to 28C. In the construction of the stators included in the electrostatic actuator according to this embodiment of the present invention, a second substrate 11B shown in FIGS. 27A to 27D is bonded to a first substrate 11A shown in FIGS. 26A to 26D so as to prepare the construction of the stator shown in FIGS. 28A to 28C.

Figures 27A, 27B:
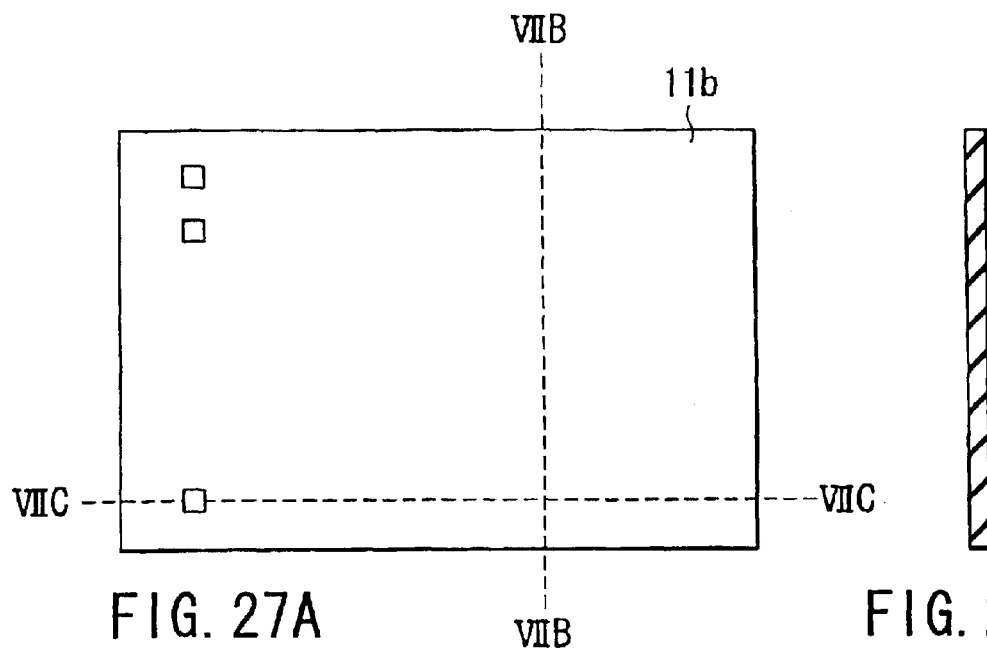
FIGS. 27A to 27D are a plan view, two cross sectional views, and a back view collectively showing schematically the construction of the stator of an electrostatic actuator according to another embodiment of the present invention.
Figure 27C:
Figure 27D:
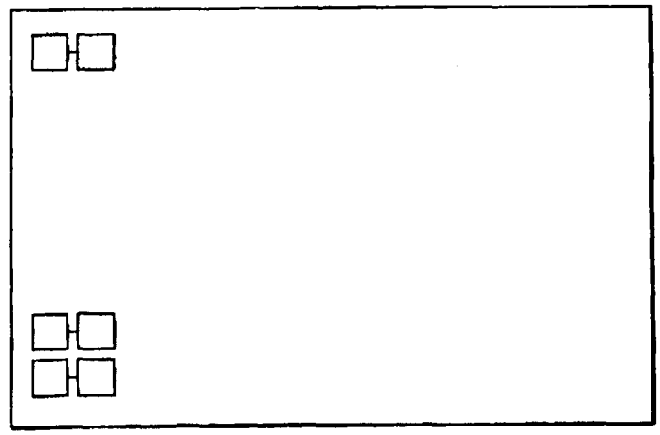
Figures 28A, 28B:
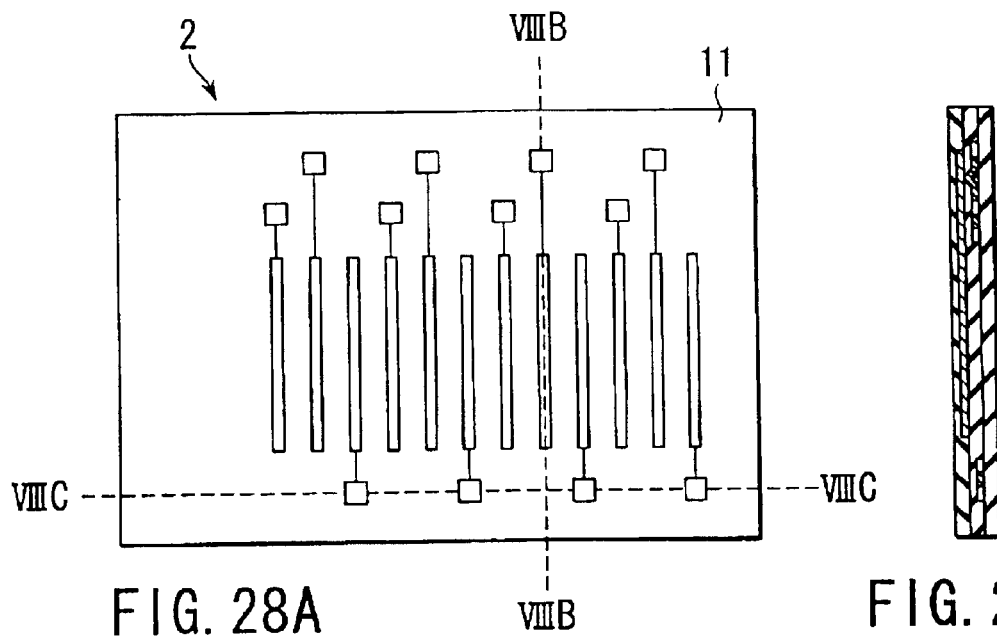
FIGS. 28A to 28C are a plan view and two cross sectional views collectively showing schematically the construction of the stator of an electrostatic actuator according to another embodiment of the present invention.
Figure 28C:
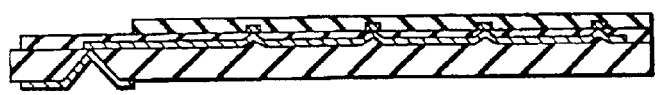

FIG. 26A is a plan view of the substrate 11A, FIGS. 26B and 26C are cross sectional views along the lines B—B and A—A, respectively, shown in FIG. 26A, and FIG. 26D is a back view of the substrate 11a. In the substrate 11A shown in FIGS. 26A to 26D, the stator electrodes 22A to 22C are arranged on the substrate 11 in parallel. The wirings connected to the stator electrodes 22A to 22C extends linearly so as to be connected to the terminals, and terminals of the wirings are connected to the terminals arranged on the back surface of the substrate 11 via the through-holes extending through the substrate 11. The terminals corresponding to the stator electrodes 22A to 22C are electrically connected to a common terminal, as shown in FIG. 26D. Also, a connection terminal that is to be connected to the common terminal as shown in FIG. 27A is formed on a second substrate 11B shown in FIGS. 27A to 27D. The common terminal is connected to a connection terminal formed on the back surface of the substrate 11B via a through-hole extending through the substrate 11B. The back surface of the first substrate 11A and the front surface of the second substrate 11B are bonded to each other so as to permit the common terminal and the connection terminal to be bonded to each other, thereby manufacturing a stator structure as shown in FIGS. 28A to 28C.

The specific manufacturing method of the stator structure shown in FIGS. 28A to 28C will now be described. In the first step, through-holes corresponding to the stator electrodes 22A to 22D are formed in predetermined regions of the substrate 11A. By forming terminals in these through-holes, the terminals are connected to the wirings connected to the stator electrodes 22A to 22C. It is possible to form concave portions in those regions of the substrate 11A in which the terminals are formed and to form through-holes within these concave portions. In this case, the terminals connected to the wirings extending from the stator electrodes 22A to 22C are arranged within the through-holes such that the terminals corresponding to the stator electrodes 22A to 22C are connected to each other within the concave regions. By forming the concave portions on the back surface of the substrate 11A, a clearance between the substrate 11A and the other substrate 11B is not generated even if the substrate 11B is bonded to the back surface of the substrate 11A, making it possible to bring the substrates 11A and 11B into a sufficient contact by the bonding.

Incidentally, it is possible for the through-hole not to extend through the substrate 11A. In other words, it is possible to form a concave portion having a depth large enough to form a through-hole in the subsequent step of polishing the substrate 11A.

The substrate 11A having a through-hole formed therein is bonded to the substrate 11B. Where the substrates are formed of a silicon substrate and a glass substrate, an anodic bonding method can be employed for the substrate bonding. Where silicon substrates are bonded to each other, it is possible to employ a suitable method depending on the kind of the substrate such as a water glass method. It is possible for a through-hole or a wiring for the lead of the wiring to be formed in advance in the substrate 11B that is to be bonded. In the substrate 11 prepared by bonding two substrates, the substrate 11 is polished until the substrate 11A has a predetermined thickness. After the polishing step, the through-hole is allowed to extend through the substrate 11A. Then, the wirings for the stator electrodes 22A to 22C are formed on the polished surface of the substrate 11A so as to connect the terminals of the wirings to the wirings on the back surface of the substrate 11A.

Further, where the terminals within the through-holes and the wirings that are to be connected to these terminals are not formed in advance on the side of the substrate 11B, these terminals and the wirings are formed, followed by connecting the substrate 11A to the wirings of the substrate 11B so as to finish preparation of the stator 2.

In the manufacturing process described above, there is a merit on the process that it suffices for the processing depth of the through-hole formed in the substrate 11A to be small. Also, the through-hole is formed by the general isotropic processing. In other words, if it is intended to form a through-hole in a certain depth direction, the lateral processing is also performed in the same amount. As a result, the diameter φ of the through-hole that can be formed is limited by the thickness of the substrate through which the through-hole extends, giving rise to a limit in forming a plurality of through-holes close to each other. The limitation provides an obstacle in making fine the arranging pitch of the electrodes corresponding to the electrodes of the slider formed on the surface of the substrate 11A. In the manufacturing process described above, it is possible to expect a prominent effect that the arranging pitch of the surface electrodes of the substrate 11 can be made sufficiently small. Incidentally, in this embodiment, the wiring of the electrodes formed on the surface of the substrate 11A in the other embodiments is formed on the back surface of the substrate 11A. However, it is possible to form the wiring section on the surface of the substrate 11B.

Figures 29A, 29B:
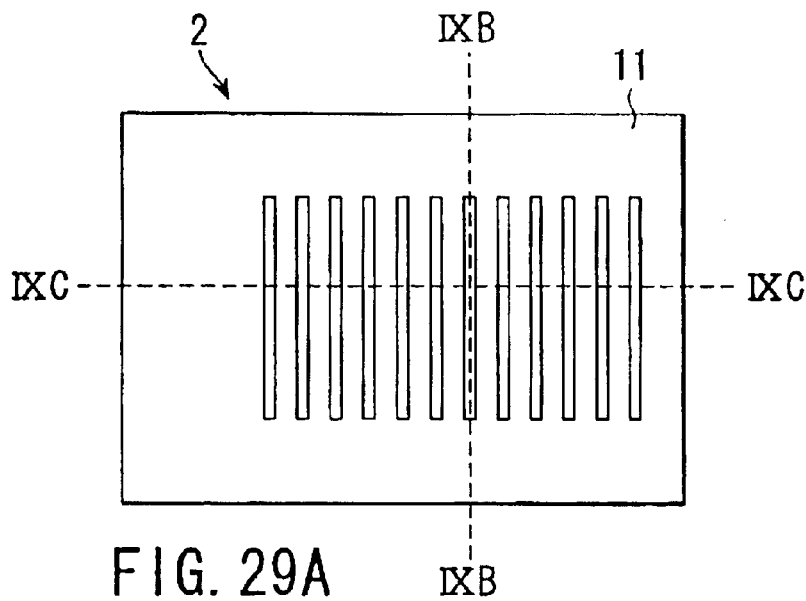
FIGS. 29A to 29D are a plan view, two cross sectional views, and a back view collectively showing schematically the construction of the stator of an electrostatic actuator according to another embodiment of the present invention.
Figure 29C:
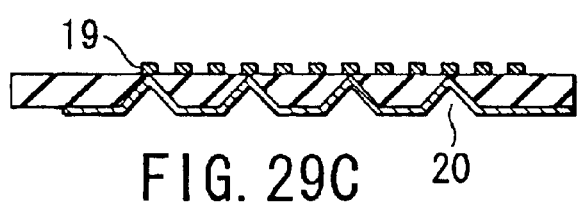
Figure 29D:
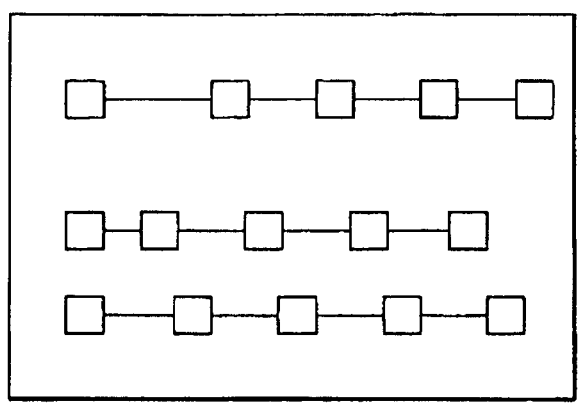

Another construction relating to the stator included in the electrostatic actuator of the present invention will now be described with reference to FIGS. 29A to 29D. FIG. 29A is a plan view showing the construction of the stator 2, FIGS. 29A and 29C are cross sectional views along the lines B—B and A—A, respectively, shown in FIG. 29A, and FIG. 29D is a back view of the substrate 11.

In the stator structure shown in FIGS. 29A to 29D, an SOI substrate is used as the substrate 11 of the stator 2, and each electrode is formed of bulk silicon. A silicon structure 19 forming each electrode is formed on one surface of the SOI substrate 11 by using, for example, a DRIE apparatus. It is possible to further form an insulating film (not shown) on the surface of the silicon structure 19.

A through-hole 20 for taking out the electrode is formed on the back surface of the substrate, and a terminal acting as an electrode connected to the silicon structure is arranged within the through-hole.

As a modification of the structure shown in FIGS. 29A to 29D, it is possible for each electrode to be formed of a Ni structure in place of the silicon structure.

In the manufacturing process of the modification, a metal layer forming a seed layer of plating is formed on the oxidized silicon substrate. A thick resist film is formed on the substrate, and the resist film thus formed is exposed to light, followed by a developing process, thereby forming a mold structure for forming an electrode structure. Then, a Ni layer forming the electrode structure is formed by an electroplating method, followed by removing the thick resist film and subsequently applying an insulating film coating. Through these steps, the process of manufacturing the electrode structure is finished. In this manufacturing process, an adjusting step for adjusting the stator structure, e.g., the surface polishing step, is performed as desired.

Incidentally, a through-hole for taking out the electrode is formed on the back surface of the substrate like the structure shown in FIGS. 29A to 29D, and a terminal is arranged within the through-hole and the terminal thus arranged is connected to the electrode structure and is connected to the wiring on the back surface.

An application to which the electrostatic actuator of the present invention is applied will now be described with reference to FIG. 30.

The electrostatic actuator of the present invention is excellent in its driving characteristics and, thus, is adapted for use in a focus adjusting mechanism of a small camera.

Figure 30:
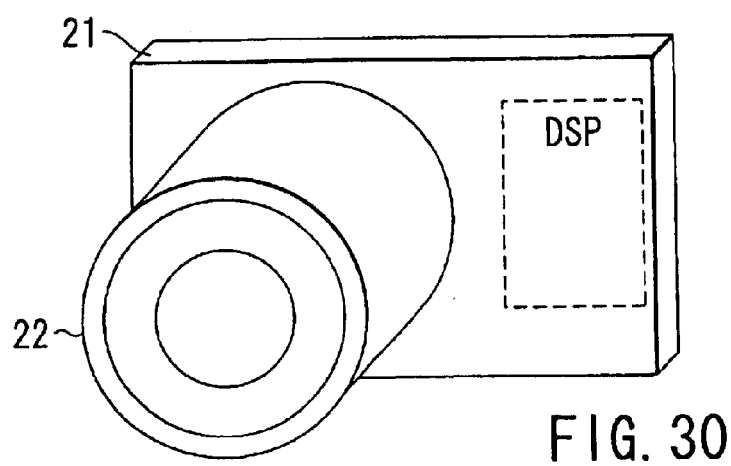
FIG. 30 is a perspective view schematically showing a focus control mechanism as an application of an electrostatic actuator of the present invention.

FIG. 30 shows a module portion of a small camera having the electrostatic actuator of the present invention mounted thereto. As shown in FIG. 30, a CMOS or a CCD is mounted on a substrate 21, and an electrostatic actuator 22 is mounted thereon. A slider integral with the camera is used as the slider included in the electrostatic actuator. Also, an IC such as a DSP for controlling the driving of the electrostatic actuator is mounted on the substrate 21.

The camera module of the particular construction can be used as a camera unit included in, for example, a portable telephone or a digital camera.

As described above, the present invention provides an electrostatic actuator that can be manufactured at a low cost and is adapted for the mass production.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera module for photographing a picture image, comprising:

an image pick-up element; and an electrostatic actuator mechanism mounted to the image pick-up element, the electrostatic actuator mechanism including:

a first stator provided with an electrode group including at least three electrodes successively arranged in a predetermined direction, voltage being applied to the electrodes respectively;

a second stator arranged to face the first stator and provided with an electrode extending in the predetermined direction;

a movable member arranged between the first stator and the second stator, and provided with a first electrode section facing the electrode group, a second electrode section facing the electrode extending in the predetermined direction, and an optical element configured to form an optical image on the image pick-up element; and a switching circuit configured to apply voltage alternately to at least one of the electrodes forming the electrode group and the electrode extending in the predetermined direction, the potential of at least one of the electrodes forming the electrode group being rendered higher than the potential of the first electrode section, or the potential of the electrode extending in the predetermined direction being rendered higher than the potential of the second electrode section, and to switch the order of applying voltage successively to at least one of the electrodes of the electrode group.

2. The camera module according to claim 1, wherein the switching circuit applies voltage simultaneously to at least two electrodes forming the electrode group adjacent to each other in the predetermined direction.

3. The camera module according to claim 1, wherein a width in the predetermined direction of the first electrode section mounted to the movable member is 1.5 to 2.5 times as much as a width in the predetermined direction of each of the electrodes forming the electrode group.

4. The camera module according to claim 1, further comprising a dielectric film formed to cover the electrode group.

5. The camera module according to claim 4, wherein the switching circuit is configured to impair a potential difference such that the potential of at least one of the electrodes forming the electrode group is rendered lower than the potential of the first electrode section, when voltage is applied to the electrode extending in the predetermined direction.

6. The camera module according to claim 1, further comprising a dielectric film formed to cover the first electrode section.

7. The camera module according to claim 6, wherein the switching circuit is configured to impair a potential difference such that the potential of at least one of the electrodes forming the electrode group is rendered lower than the potential of the first electrode section, when voltage is applied to the electrode extending in the predetermined direction.

8. The camera module according to claim 6, wherein the first and second electrode sections bear substantially the ground potential.

9. The camera module according to claim 1, wherein the optical element is driven together with the movable member.

10. The camera module according to claim 1, wherein the first and second stators include stoppers projecting from upper surfaces of the electrode group and the electrode extending in the predetermined direction, and the movable member is provided with regions in which the stoppers are slid, the regions being formed on surfaces on which the first and second electrode sections are formed.

11. The camera module according to claim 1, wherein the movable member includes stoppers projecting from surfaces of the first and second electrode sections, and the first and second stators are provided with regions in which the stoppers are slid, the regions being formed on surfaces on which the electrode group and the electrode extending in the predetermined are formed.

12. The camera module according to claim 1, wherein the electrode group includes three electrodes to which voltage is applied respectively.

13. The camera module according to claim 1, wherein the electrode group includes four electrodes to which voltage is applied.

14. The camera module according to claim 4, wherein the first and second electrode sections bear substantially the ground potential.

* * * * *